United States Patent [19]

Dahlke

[11] Patent Number: 4,516,210
[45] Date of Patent: May 7, 1985

[54] PROGRAMMABLE TRAY FORMING MACHINE

[75] Inventor: Douglas F. Dahlke, Seattle, Wash.

[73] Assignee: Marq Packaging Systems, Inc., Yakima, Wash.

[21] Appl. No.: 485,909

[22] Filed: Apr. 18, 1983

[51] Int. Cl.³ .................. G06F 15/46; B31B 3/02
[52] U.S. Cl. .................. 364/471; 364/468; 493/17; 493/143
[58] Field of Search ........ 364/468, 469, 471, 140–147; 493/1, 2, 7, 13, 14, 17, 18, 21, 23, 37, 127, 131, 493/136, 138, 140, 142, 143, 163, 168

[56] References Cited

U.S. PATENT DOCUMENTS

| 4,012,999 | 3/1977 | Crawford et al. | 493/127 |
| 4,261,254 | 4/1981 | Nowacki | 493/7 |
| 4,411,642 | 10/1983 | Gee | 493/131 X |
| 4,460,349 | 7/1984 | Charron | 493/131 X |

Primary Examiner—Joseph Ruggiero
Attorney, Agent, or Firm—Christensen, O'Connor, Johnson & Kindness

[57] ABSTRACT

A tray forming machine, including a programmable controller that controls: (a) the movement of tray blanks from a hopper (41) to a conveyor (73) that moves trays from a hopper station (31) through a glue station (33) to a mandrel station (35); (b) the application of glue to tray blanks (43) moved by the conveyor (73) through the glue station (33); and, (c) the formation of the tray blanks (43) into trays at the mandrel station (35), is disclosed. The programmable controller controls the operation of the tray forming machine in accordance with operator instructions, which include tray length, glue pattern length, margin distance and mandrel dwell time, plus on/off instructions regarding glue application and glue format (stitch or continuous). The readily changeable operator inserted instructions are entered via a control/display unit (135), which displays information about the function and changes being made when the instructions are being entered.

16 Claims, 22 Drawing Figures

| CONTROL BYTE | BIT POSITION | | | | | | | |
|---|---|---|---|---|---|---|---|---|
| | 0 | 1 | 2 | 3 | 4 | 5 | 6 | 7 |
| HOPPER | HOPPER ACTIVE BIT | STARTUP BIT | | | PULL BIT | PUSH BIT | HOPPER COUNTER BIT | TIME TO GET BLANK BIT |
| MANDREL | MANDREL OPEN BIT | | MANDREL TIMING BIT | MANDREL RUNNING BIT | | | | MANDREL CLOSING BIT |
| TRANSFER | | | | | | | GLUE BIT | TRANSFER IN PROGRESS BIT |
| JAM | GLUE JAM BIT | MANDREL JAM BIT | HOPPER EMPTY BIT | | | | | JAM RUNNING BIT |

Fig. 8.

Transfer Subroutine

4,516,210

PROGRAMMABLE TRAY FORMING MACHINE

TECHNICAL AREA

This invention is directed to case handling machines and, more particularly, to tray forming machines.

BACKGROUND OF THE INVENTION

In the past, various types of case handling machines have been developed. Case handling machines include machines for assembling or erecting cases, machines for sealing cases and machines for placing inserts in cases, plus various combinations thereof. For example, some case handling machines both assemble or erect cases and, then, partially seal the erected cases. Other case handling machines merely seal cases. In some instances, sealing is accomplished using an adhesively coated tape. In other instances, an adhesive is applied directly to the major and/or minor flaps of the case to be sealed.

A tray is a specialized case that is low and flat when assembled, and usually formed such that major and minor flaps to be attached to one another are located on opposite sides of the case, rather than at the top and/or bottom of the case. Trays are often used to house a plurality of similar products, such as a case of beer or pop, several grapefruit or a plurality of ceramic objects, for examples. Trays can be open topped; or, include a top designed to be folded over and inserted with or without being sealed, after the item or items to be housed in the tray have been placed therein.

The present invention is directed to tray forming machines suitable for applying adhesive to the side major flaps of tray blanks, folding the glue bearing side major flaps over side minor flaps and causing the glue joined flaps to adhere to one another.

In the past, tray forming machines have been either entirely manually controlled or semi-automatically controlled. Manually controlled machines are undesirable because they are slow and labor intensive. While semi-automatically controlled machines are faster and, generally, decrease the amount of skilled labor needed, semi-automatically controlled machines have other disadvantages.

The major disadvantage of prior art semi-automatically controlled tray forming machines is the difficulty associated with changing the mode of operation of such machines. Mode of operation changes are required because tray sizes vary over a wide range. Mode of operation changes are also required because joint strength varies depending upon the size and weight of the product or item to be housed in the tray. Because different joint strength requirements exist, different trays have different glue amount requirements. In order to change the mode of operation of prior art semi-automatically controlled tray forming machines, various adjustments must be made by a skilled mechanic. Moreover, the mechanical control systems used in prior art machines (which include timing wheels and related mechanical devices) are subject to wear and, thus, frequent adjustment by a skilled mechanic. In addition to the cost attendant to the services of a skilled mechanic, the loss of machine time (e.g., machine downtime) attendant to such changes is greater than desirable. Machine downtime is undesirable for two reasons—the idle time of the machine operator; and, the idle time of employees filling the trays being formed by the machine. Thus, there is a need for a tray forming machine having a control system that is not subject to mechanical wear and whose mode of operation can be rapidly changed without requiring the services of a skilled mechanic.

SUMMARY OF THE INVENTION

In accordance with this invention, a tray forming machine including a programmable controller is provided. The programmable controller controls the movement of pre-cut tray blanks from a hopper station through a glue station to a forming station. At the hopper station the tray blanks are moved one at a time from a hopper to a conveyor. The conveyor moves the tray blanks past the glue station to the forming station. Depending upon whether the side major and minor flaps are or are not to be adhesively joined, glue either is or is not applied as the tray blanks are moved through the glue station by the conveyor. At the forming station a mandrel presses the tray blanks into a forming die that causes the various flaps of the blank to bend over one another in the appropriate order to create a tray. If adhesive is applied as the tray blanks are moved through the glue station the mandrel remains in the die and presses the glued flaps together for a period of time adequate to allow the flaps to adhere to one another.

In accordance with other aspects of this invention, tray blanks are vertically oriented in the hopper and moved to the conveyor one at a time by a vacuum mechanism. The vacuum mechanism includes vacuum cups that are moved across the conveyor toward the tray blanks mounted in the hopper. After becoming vacuum attached to the nearest tray blank the vacuum cups are pulled back across the conveyor, maintaining the attached tray blank in a vertical plane. When the blank reaches a position above the conveyor, vacuum coupling is terminated and the blank drops onto the conveyor, which is continuously moving. As a result, the tray blank is immediately moved through the glue station to the forming station whereat it is stopped while the conveyor remains in motion.

In accordance with further aspects of this invention, the programmable controller includes a sensor for sensing the presence of tray blanks at a point where they can be reached by the vacuum mechanism. Further, in accordance with other aspects of this invention, a ratchet mechanism is provided for moving tray blanks mounted in the hopper toward the vacuum mechanism. The ratchet mechanism is actuated by the programmable controller when the tray blank sensing mechanism fails to sense a tray blank.

In accordance with yet other aspects of this invention, the programmable controller includes another sensor located at the glue station for sensing the leading edge of a tray blank entering the glue station. When the leading edge is sensed, the programmable controller initiates a sequence of operation that controls the application of glue to the appropriate flaps of the tray blank, if glue is to be applied. If the programmable controller is programmed not to apply glue, this sequence is bypassed. Further, the programmable controller can be programmed so that glue will be applied in either an intermittent (stitch) pattern or a continuous pattern. (Since trays normally have a low vertical profile, in most instances a continuous pattern will be used.) In addition to the configuration of the pattern, the programmable ontroller controls glue pattern length, plus the starting and stopping points based on information inserted by an operator.

In accordance with yet other aspects of this invention, the dwell time of the mandrel pressing a tray blank into the forming die is operator controllable. Thus, the operator can set a dwell time adequate for flaps to which glue is applied at the glue station to become adhesively attached to adjacent flaps at the mandrel station.

In accordance with yet other aspects of this invention, the programmable controller includes: a central processing unit; a control/display unit; various sensing switches; and, a position encoder that is actuated by the conveyor, which is preferably chain driven. Preferably, the central processing unit includes a microprocessor that is programmed by the operator of the tray forming machine via the control/display unit. Regardless of its nature, based on operator instructions entered during a programming subroutine, during a run subroutine, the central processing unit controls the operation of the heretofore described mechanical mechanisms—the vacuum mechanism for moving trays from the hopper to the conveyor; the hopper ratchet mechanism; the glue application mechanism; and, the mandrel mechanism. Preferably, the central processing unit includes a hopper counter that counts the number of times the ratchet mechanism is actuated to move tray blanks toward the vacuum mechanism. After a predetermined number of actuations without the tray blank sensor (located at the hopper) sensing the presence of a tray blank, ratchet movement terminates and the control/display unit is actuated to create a display denoting that the hopper is empty. In addition, preferably, the central processing unit includes a belt counter that is reset and begins to count pulses produced by the position encoder when the leading edge of a tray is sensed by the sensor located at the glue station. The pulse count is cyclically compared to stored pulse counts that are calculated from operator inserted information regarding tray length, glue pattern length and margin distance (if any); and the results of the comparison are utilized to control the application of glue as a tray blank is moved by the conveyor through the glue station.

As will be readily appreciated from the foregoing summary, the invention provides a tray forming machine whose mode of operation can be rapidly changed. Further, because the controller is in the form of a control/display unit and a microprocessor, machine adjustments caused by controller changes due to mechanical wear are avoided. Because the mode of operation of tray forming machines formed in accordance with the invention can be rapidly changed via the control/display unit, and because mechanical wear is avoided, machine downtime is low. Hence, the invention overcomes the disadvantages of prior art tray forming machines of the type discussed above.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 8 is a table illustrating the control bytes that control the operation of central processing unit (CPU) illustrated in FIG. 7;

DESCRIPTION OF THE PREFERRED EMBODIMENT

Figure 1:
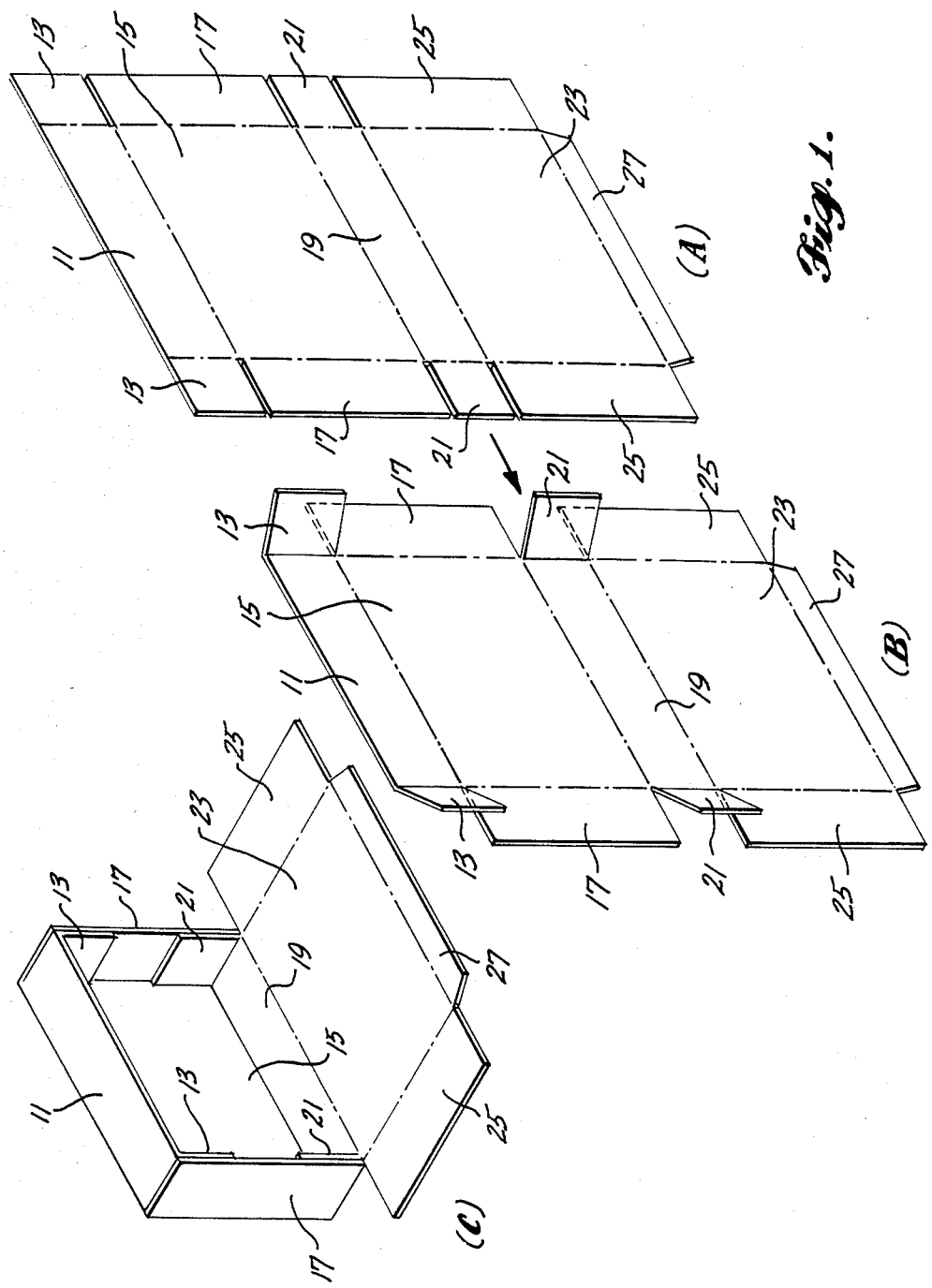
FIG. 1 is a sequential diagram illustrating the forming of a tray by a tray forming machine.
Figure 2:
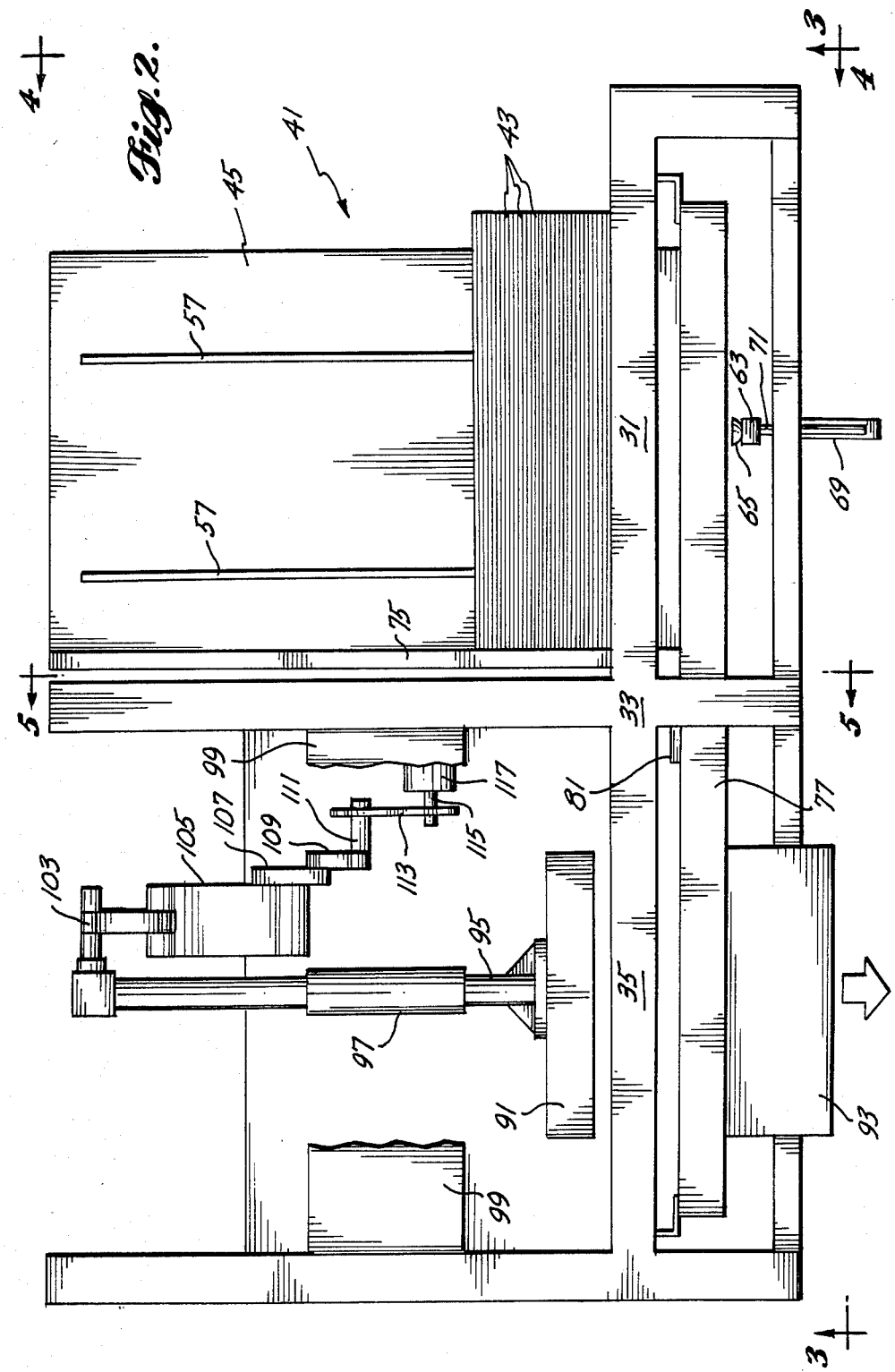
FIG. 2 is a top plan view of the mechanical portion of a preferred embodiment of a programmable tray forming machine formed in accordance with the invention.

FIG. 1 is a sequence diagram illustrating the formation of a tray by a tray forming machine. As illustrated in view (A) the tray begins as a vertically oriented blank formed of cardboard, or some other case forming material, notched and scored along various lines to define regions that will ultimately form the front, rear and sidewalls plus the top and bottom of the tray. Centrally located at the top of the tray blank illustrated in view (A) is the region that will ultimately form the front wall 11. Attached to the vertical edges of the front wall are side minor flaps 13. Centrally located beneath the front wall 11 is the region that will ultimately form the bottom 15 of the tray. Attached to the vertical edges of the bottom 15 are side major flaps 17. Centrally located beneath the bottom 15 is the region that will ultimately form the back wall 19. Attached to the vertical edges of the back wall 19 is a second set of side minor flaps 21. Centrally located beneath the back wall 19 is the region that will ultimately form the top 23 of the tray. Attached to the vertical edges of the top 23 is a second set of side major flaps 25. Finally, a region that will ultimately form a lip 27 is located beneath the top 23.

As will be appreciated by those skilled in the case art and others from the foregoing description and viewing FIG. 1, the tray blank shown in view (A) is designed to be ultimately formed into a tray having an enclosing top. In many instances, trays are formed without tops. In such instances, the top 23 and attached major side flaps 25 and lip 27 are not included in the tray blank.

As will be better understood from the following description of the mechanical mechanism illustrated in FIGS. 2-6, if glue is to be applied it is applied to the major side flap 17 attached to the bottom 15 as the tray blank is moved through a glue station. After passing through the glue station, the tray blank enters a mandrel station whereat a mandrel presses the bottom 15 into a central opening in a forming die. As this occurs, the four side minor flaps 13 and 21 first impinge on die elements and are bent away from the plane of the tray blank, as illustrated in view (B) of FIG. 1. Continued movement of the mandrel drives the blank further into the die. As this occurs, the front and rear walls 11 and 19 and the side major flaps 17 attached to the bottom 15 are all bent away from the plane of the tray blank in the same direction as the side minor flaps. Since the side minor flaps 13 and 21 are bent before the side major flaps 17, the side major flaps 17 overlie the side minor flaps 13 and 21. The die and mandrel are formed such that the bent elements ultimately achieve the form of a rectangular parallelepiped, as illustrated in view (C) of FIG. 1. As also illustrated in view (C) of FIG. 1, the top 23 and the major side flaps 25 and lip 27 attached to the top lie in the plane of the back wall 19 of the tray. As a result, the resultant open topped tray allows articles to be readily inserted. After the tray is full, the side major flaps 25 and the lip 27 attached to the top 23 are bent at right angles (toward the carton) and the top 23 is bent to close the assembled and loaded tray.

FIGS. 2-6 illustrate a mechanical mechanism suitable for use in a programmable tray forming machine formed in accordance with the invention. Since much of this mechanism is old and well known, it will not be described in detail here. Rather, only those items of the mechanical mechanism necessary to an understanding of the present invention will be described.

The mechanical mechanism moves tray blanks from a hopper station 31 through a glue station 33 to a forming station 35. Located at the hopper station 31 is a hopper 41 suitable for supporting and positioning a stack of vertically oriented tray blanks 43. The tray blanks 43 are formed of a suitably thick cardboard material having the configuration illustrated in FIG. 1 and heretofore described. The hopper 41 includes a base 45 having a horizontal upper surface 47. The lower edge of the tray blanks rest on the horizontal surface of the base 45. The base 45 lies on one side of the path of travel of the cartons from the hopper station 31 through the glue station 33 to the forming station 35. Located near the edge of the base 45 adjacent the tray blank path of travel are upper and lower stops 49 and 51. The upper stop 49 is supported by a suitable support bracket (not shown). The bottom stop 51 projects upwardly from the top of the horizontal upper surface 47 of the base 45. The vertical height of the stops 49 and 51 is relatively small. The stack of tray blanks 43 are pressed against the upper and lower stops 49 and 51 by a vertical plate 53 attached to a pair of orthogonally oriented vertical brackets 55. The lower edge of the vertical brackets 55 lie in slots 57 (FIG. 2) formed in the horizontal upper surface 47 of the base 45. The lower edges of the brackets 45 are attached to chains 59 whose path of travel underlies the slots 57. The chains 59 are moved by a ratchet mechanism (not shown). As will be readily appreciated by those familiar with mechanical mechanisms, a ratchet mechanism is a mechanism that includes a pawl and a ratchet. When deactuated, a spring holds the pawl at a quiescent position whereat it grips the item to be moved. When actuated, the pawl pulls the item to be moved. When the pawl is next deactuated it returns to its quiescent position. Thus, the item to be moved, in this case a chain, is moved in a stepped manner. Since the vertical brackets 55 and the vertical plate 53 are attached to the chains, they are step moved as the chains are step moved. The direction of movement is, of course, toward the upper and lower stops 49 and 51.

Figure 4:
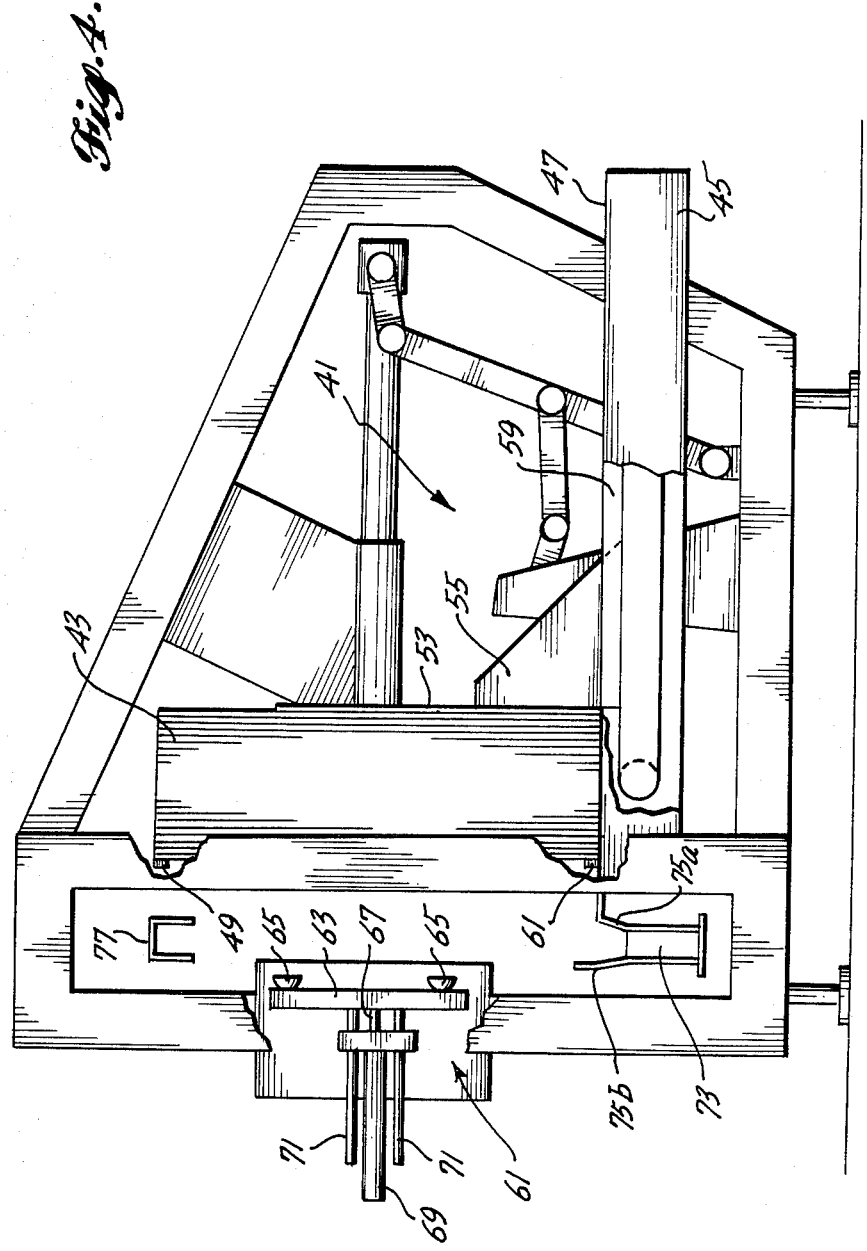
FIG. 4 is a side elevational view taken along line 4—4 of FIG. 2.

Located on the opposite side of the tray blank path of travel from the hopper is a vacuum mechanism 61 used to withdraw tray blanks one at a time from the hopper. As best seen in FIG. 4, the vacuum mechanism comprises a vertical bar 63 having vacuum cups 65 located on either end thereof. The vertical bar 62 is mounted on the end of the shaft 67 of a horizontally oriented pneumatic actuator 69. Mounted above and below the shaft 67 are a pair of horizontal guide rods 71, each attached at one end to the vertical bar 63. The vertical bar 67 is positioned so as to be aligned with the center of facing tray blank 43 of the stack of tray blanks mounted in the hopper 41 in the manner previously described. Further, the pneumatic actuator 69 is positioned to move the vertical bar 63 toward and away from facing tray blank.

When first actuated, the pneumatic actuator 69 moves the bar toward the supply of tray blanks 43. When the vacuum cups 65 impinge on the facing tray blank, they become attached thereto. Thereafter, the pneumatic actuator 69 is actuated in the opposite direction. As a result, the nearest tray blank is pulled across the upper and lower stops 49 and 51 and away from the supply of tray blanks 43. The attached tray blank is moved to a position above a continuously moving chain driven belt conveyor 73 and the vacuum applied to the vacuum cups 65 is terminated. When the vacuum cup vacuum ends, the tray blank drops onto the conveyor 72. Guide elements 75a and 75b located on opposite sides of the conveyor 73, and an upper channel 77 maintain the tray blank vertically aligned as the tray blank is moved by the conveyor. Since the conveyor 73 is continuously moving, as soon as the lower edge of a tray blank impinges on the conveyor 73 it begins moving. The conveyor 73, of course, defines the path of travel of tray blanks from the hopper station 31 through the glue station 33 to the forming station 35. Located along the edge of the hopper 41 facing the glue station 33 is a retaining wall 75, best seen in FIGS. 2 and 3.

Located at the glue station 33 is a glue head 81. The glue head 81 is attached to a suitable glue supply (not shown) and well known mechanisms that prime the glue head in accordance with prime control signals and cause the glue head to emit glue in accordance with the receipt of glue emission signals. The glue head 81 is positioned on the same side of the conveyor 73 as the hopper 41.

Located at the forming station 35, on opposite sides of the conveyor 73 are a mandrel 91 and a forming die 93. The mandrel 91 lies on the same side of the conveyor 73 as the hopper 41. The mandrel 91 is mounted on one end of a horizontally disposed shaft 95 positioned so as to be moved toward and away from the die 93. That is, the shaft 95 is positioned so as to move the mandrel 91 into and out of a central aperture 97 defined by the die 93. The details of the die are illustrated in FIG. 6 and described below.

Figure 5:
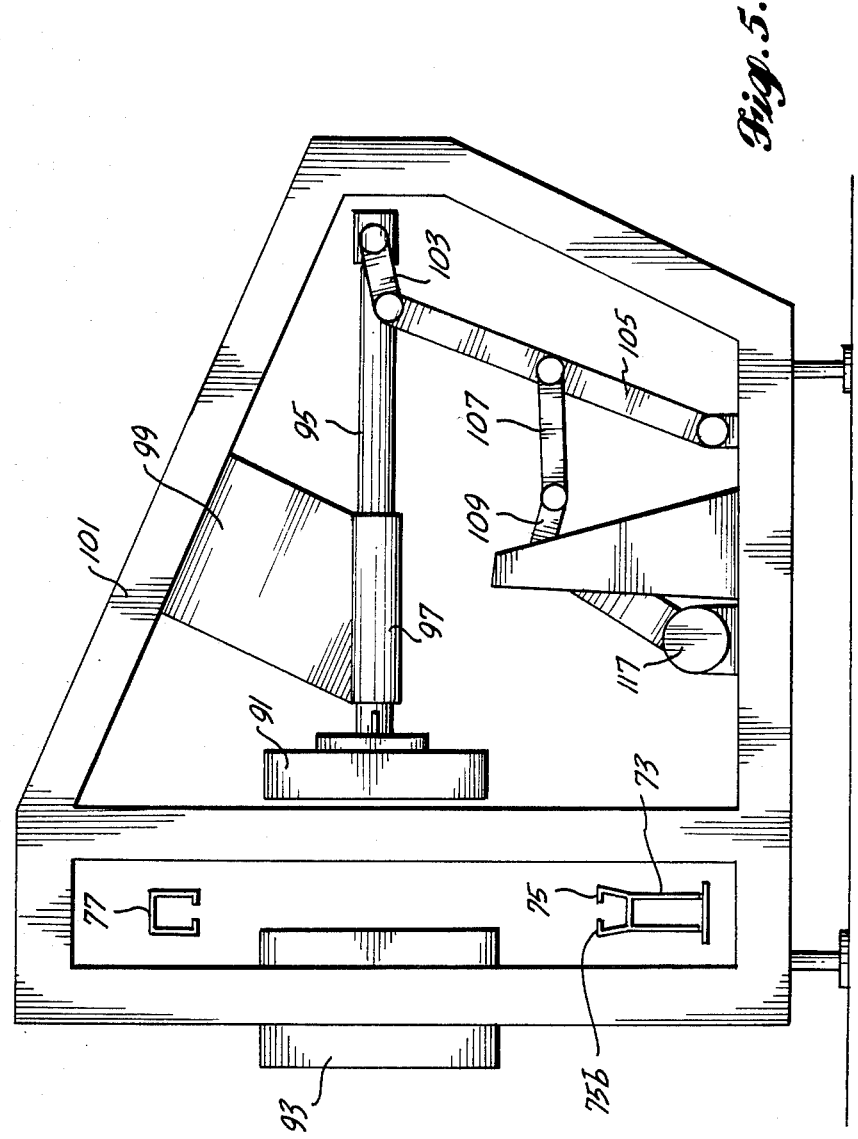
FIG. 5 is a cross-sectional view taken along line 5—5 of FIG. 2.

As best shown in FIG. 5, the shaft 95 is housed in a cylinder 97 supported by a bracket 99 from the frame 101 that supports various elements of the herein described forming mechanism. The end of the shaft 95 remote from the mandrel 91 is rotatably attached by a link 103 to one end of a bar 105. The other end of the bar 105 is rotatably attached to the base of the frame 101. A second link 107 is rotatably attached at one end to the midregion of the bar 105. The other end of the second link 107 is rotatably attached to a crank arm 109. The crank arm 109 is mounted on a shaft 111 (FIG. 2) that is attached by a chain sprocket mechanism 113 to the shaft 115 of a mandrel drive motor 117. The mounting and connection of the various links is such that when the mandrel drive motor 117 is actuated the chain coupling rotates the crank arm 109. Rotation of the crank arm 109 first pulls the link 107 and, thus, the bar 105 toward the conveyor 73. This action moves the shaft 95 and, thus, the mandrel 91 toward the forming die 93. Movement continues in this direction until the mandrel 91 is positioned in the forming die 93. As will be better understood from the following description, when this position is reached, energization of the mandrel drive motor 117 is temporarily halted. After programmed mandrel dwell time has elapsed, the mandrel motor is again energized. Further movement of the shaft of the mandrel drive motor causes a reversal of the direction of movement of the shaft 95 and, thus, the mandrel 91. As a result, the mandrel is withdrawn from the die and returned to its quiescent position.

As illustrated in FIG. 5, the channel 77 that guides the upper edge of the tray blanks as they are moved by the conveyor narrows to a slot in the region between the mandrel 91 and the forming die 93. Similarly, the guides 75a and 75b located on opposite sides and above the conveyor 73 narrow to a slot in the region between the mandrel and the forming die. As a result, precise vertical positioning of a tray blank occurs at the forming station 35. Movement of the tray blank by the conveyor is halted at the forming station by the leading edge of the tray blank impinging on a stop (not shown). When the tray blank impinges on the stop, it "slips" on the upper surface of the conveyor 73, which, as noted above, is a chain driven belt.

Figure 6:
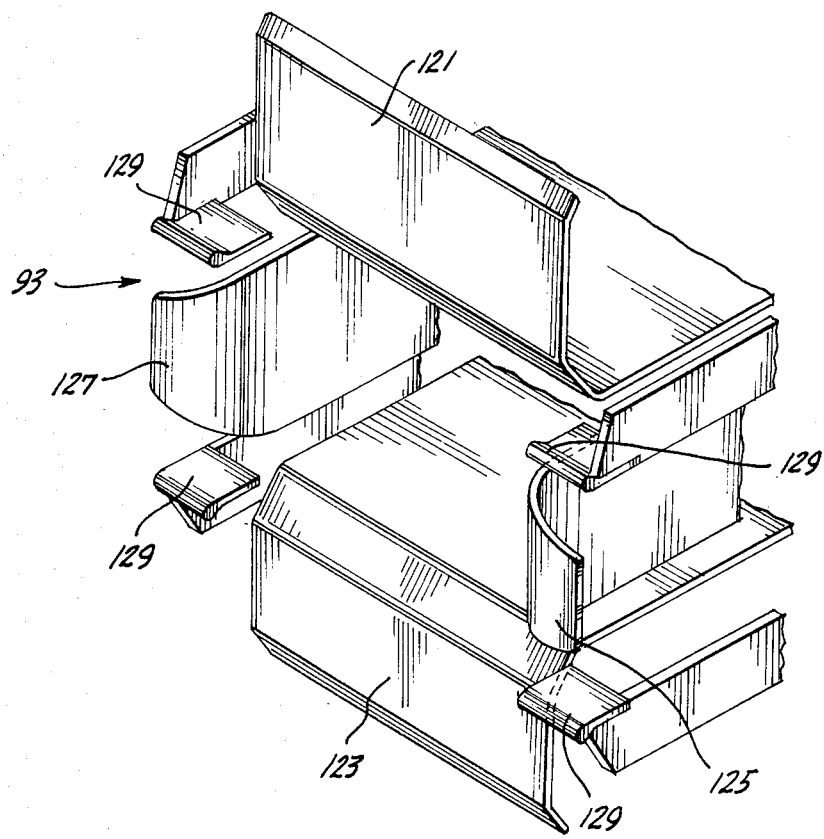
FIG. 6 is a perspective view of the input end of the forming die located at the forming station of the programmable tray forming machine illustrated in FIGS. 2-5.

As illustrated in FIG. 6, the forming die 93 includes a plurality of die elements. The die elements comprise upper and lower curved plates 121 and 123, right and left curved plates 125 and 127 and corner die elements 129. The corner die elements are positioned at corners defined by adjacent upper and lower and right and left curved plates 121, 123, 125 and 127. The outer regions of the curved plates 121, 123, 125 and 127 define a vertical plane that is offset from a vertical plane defined by the outer edges of the corner die elements 129. Further, the vertical plane defined by the outer edges of the corner die elements lies nearer the path of travel of the tray blanks than the vertical plane defined by the outer regions of the curved plates. The corner die elements are positioned to intersect the side minor flaps 13 (FIG. 1) and the curved elements are positioned to intersect the front and rear walls 11 and 19 and the side major flaps 17 attached to the bottom 15. Further, the bottom is aligned with the central aperture 97 in the die 93. As a result, as illustrated in view (B) of FIG. 1, the side minor flaps 13 are bent prior to when the front and rear walls 11 and 19 and the side major flaps 17 attached to the bottom 15 are bent.

Figure 7:
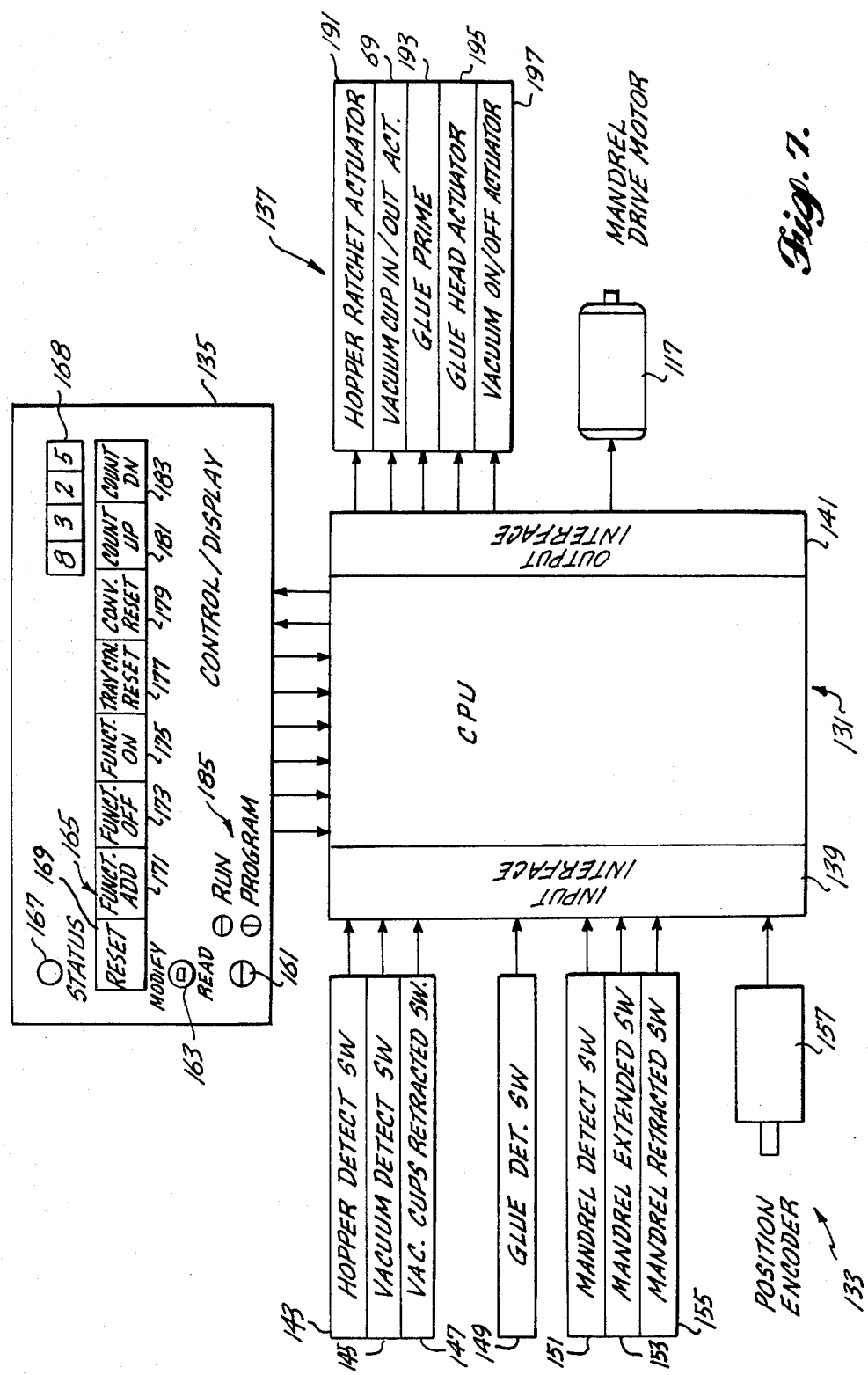
FIG. 7 is a block diagram illustrating a controller suitable for use in a programmable tray forming machine formed in accordance with the invention.

FIG. 7 is a block diagram of the electrical portion of a programmable tray forming machine formed in accordance with the invention and comprises: a central processing unit (CPU) 131; a plurality of input sensors 133; a control/display unit 135; and, a plurality of controlled devices 137. In addition to a microprocessor, and suitable memory and other required devices, the CPU also includes an input interface 139 and an output interface 141.

The plurality of input sensors 133 comprise: a hopper detect switch 143; a vacuum detect switch 145; a vacuum cup retracted switch 147; a glue detect switch 149; a mandrel detect switch 151; a mandrel extended switch 153; and, a mandrel retracted switch 155. The hopper detect switch is a switch (preferably, a microswitch) located on the upstream side (FIG. 3) of the path of travel of tray blanks 43 from the hopper station through the glue station to the forming station. The hopper detect switch 143 is located such that its actuation arm impinges on the facing tray blank of the supply of tray blanks 43 mounted in the hopper 41. As will be better understood from the following description, the hopper detect switch provides information that is utilized by the CPU to control the actuation of the ratchet mechanism that presses tray blanks against the upper and lower stops 49 and 51 of the hopper mechanism.

The vacuum detect switch 145 is a vacuum actuated switch connected in the vacuum line running to the vacuum cups 65 that detects the change in vacuum that occurs when the vacuum cups 65 become attached to a tray blank 43. The vacuum cups retracted switch 147 is a switch (preferably, a microswitch) that is actuated when the vertical bar 63 is located at its retracted or withdrawn position. When the vertical bar 63 (and, thus, the vacuum cups 65) is away from the retracted position, the vacuum cups retracted switch is in the state opposite to the state the switch is in when the cups are retracted.

Figure 3:
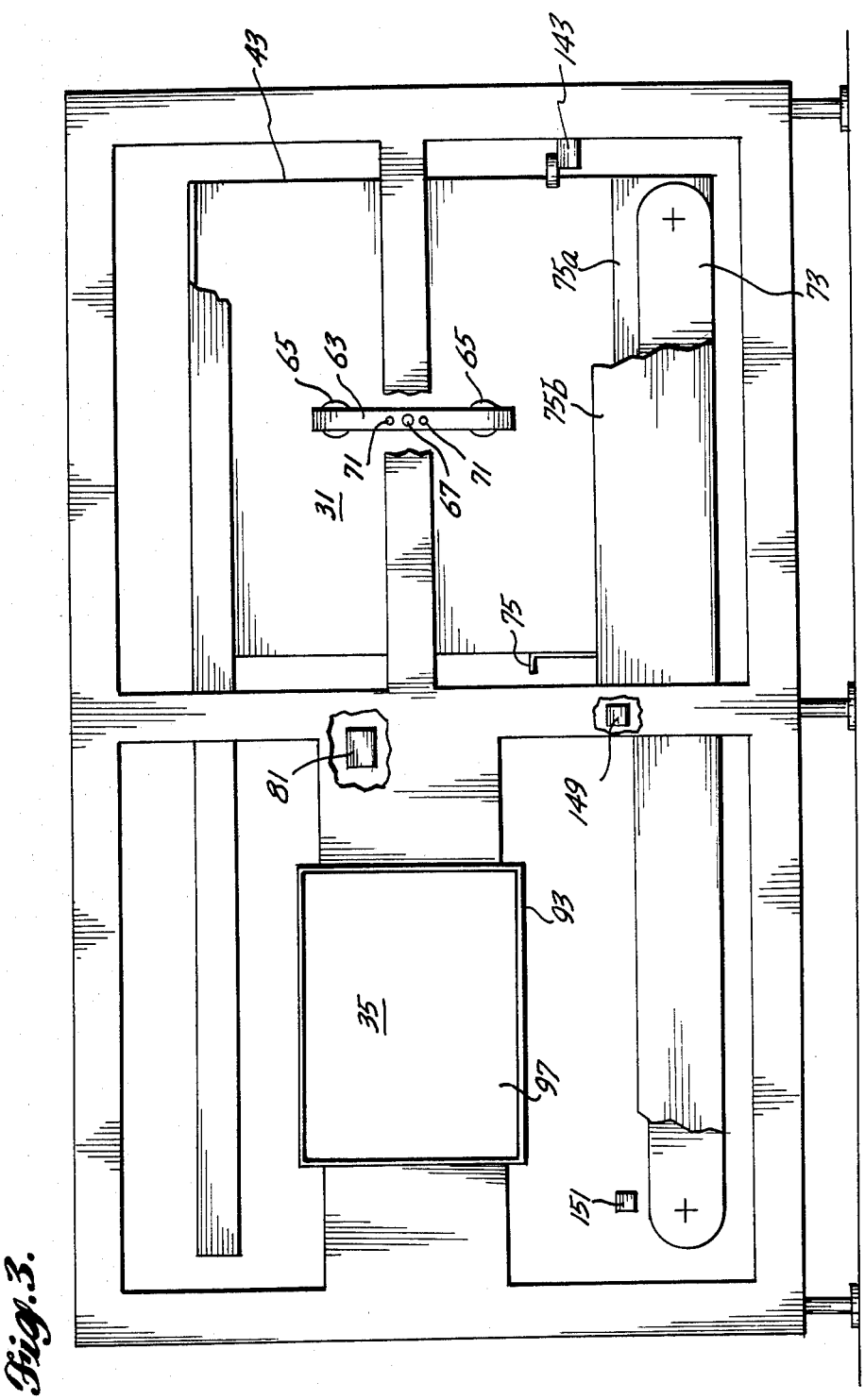
FIG. 3 is a front elevational view taken along line 3—3 of FIG. 2.

The glue detect switch 149 is located slightly upstream of the glue head 81, as illustrated in FIG. 3. Preferably, the glue detect switch 149 is a photodetector switch that includes a light source located on one side of the tray blank path of travel and a light detector mounted on the other side of the path of travel. When a tray being moved by the conveyor interrupts the light beam it causes a change in the output of the light detector element.

The mandrel detect switch 151 is located near the downstream end of the tray blank path of travel, slightly upstream of the stop that stops movement of a tray blank at the forming station 35. As with the glue detect switch, preferably, the mandrel detect switch is a photodetector switch that includes a light source located on one side of the path of travel of a tray blank and a light detecting element located on the other side of the path of travel. Preferably, the mandrel extended switch is a microswitch actuated by the mandrel when the mandrel lies inside of the forming die 93. Finally, the mandrel retract switch is, preferably, a microswitch position to detect when the mandrel is retracted.

In addition to the just described switches, the input sensors 133 also include a position encoder 157. The position encoder is driven by the chain that moves the conveyor belt or by the chain drive source. Regardless of how coupled, each increment of movement of the conveyor cause the position encoder 157 to produce a pulse. The pulses are used by the CPU 131 in the manner hereinafter described to control the application of glue to tray blanks as they are moved through the glue station.

The control/display unit 135 provides an operator interface with the CPU 131. The control/display unit includes: a run-program swtich 161; a read-modify switch 163; a plurality of program keys 165; a status light 167; and, an alphanumeric display 168. The program keys 165 include: a reset key 169; a function-address key 171; a function off key 173; a function on key 175; a tray count reset key 177; a conveyor reset key 179; a count-up key 181; and, a countdown key 183. The run-program switch 161 is, preferably, a two position key-operated switch—the two positions are denoted the run position and the program position. When in the run position, the run-program switch 161 places the tray forming machine in a run mode of operation. In the program position, the run-program switch places the machine in a programming mode of operation. Preferably, a run-program switch display 185 is provided to show the key positions for the two modes of operation. The use of a key switch has the advantage of preventing unauthorized or inadvertent reprogramming of the tray forming machine. Preferably, the read-modify switch 163 is a two-position toggle switch that can be placed in either a read or a modify position. Preferably, the program keys 165 are momentary contact panel switches of the type utilized in a wide variety of electronic devices, such as calculators, keyboards, etc. The status light 167 is, preferably, a light emitting diode (LED) covered with a suitably colored lens, e.g., a red lens. Preferably, the alphanumeric display 168 is a four (4) character display suitable for displaying either letters or numbers, as desired.

The devices 137 controlled by the CPU 131 include: a hopper ratchet actuator 191; the vacuum cup in/out pneumatic actuator 69; a glue prime actuator 193; a glue head actuator 195; and, a vacuum on/off actuator 197. Preferably, the hopper ratchet actuator 191 is a pneumatic actuator. In any event, the hopper ratchet actuator actuates the ratchet mechanism that moves tray blanks located in the hopper toward the conveyor 73 in the manner heretofore described. As previously described, the vacuum cup in/out actuator is a pneumatic actuator that moves the vacuum cups 65 toward and away from the tray blanks 43 mounted in the hopper 41. The glue prime actuator 193 is an actuator for a glue prime pump required for certain types of glue heads. The glue prime pump pressurizes the glue pump 81 prior to its being actuated to emit glue. The glue head actuator 195, upon receipt of a suitable actuation signal from the CPU, causes the glue head 81 to emit glue. The vacuum on/off acuator 197 controls the application of vacuum to the vacuum cups 65.

In addition to the various actuators described above, the CPU 131 via the output interface 141 controls the energization of the mandrel drive motor 177. As previously described, energization of the mandrel drive motor causes the mandrel to move first toward and then away from the forming die 93.

As will be readily appreciated from the foregoing description, the electrical portion (FIG. 7) of the preferred embodiment of a programmable tray forming machine formed in accordance with the invention includes several sensors plus a position encoder. The information produced by the sensors, in combination with the way the CPU is both preprogrammed and programmed by an operator via the control/display unit 135, controls the sequence of operation of the mechanical portion (FIGS. 2-6) of the preferred embodiment. The CPU makes continual passes through a program with the branches followed during any path being determined by various factors, primarily how the CPU is programmed and the position of a tray blank in the machine at the time the pass is made. The various paths or sequences of operation are illustrated in a series of flow diagrams (FIGS. 9-22) described below. As passes are made through the program the high/low state of bits of four control bytes illustrated in tabular form in FIG. 8 are selectively changed. That is, each of the control bytes, designated the HOPPER, MANDREL, TRANSFER and JAM control bytes, is formed of a plurality of bits. In the illustrated embodiment, each byte comprises eight (8) bits. While eight (8) bits are included in each byte, not all of the bits of each byte are utilized. As illustrated in FIG. 8, six (6) bits of the HOPPER byte are utilized. The used bits are designated: HOPPER ACTIVE bit; START-UP bit; PULL bit; PUSH bit; HOPPER COUNTER bit; and TIME TO GET BLANK bit. Four (4) bits of the MANDREL byte are utilized. These bits are designated: MANDREL OPEN bit; MANDREL TIMING bit; MANDREL RUNNING bit; and MANDREL CLOSING bit. Only two (2) bits of the TRANSFER byte are utilized. These are designated: GLUE bit and TRANSFER IN PROGRESS bit. Four (4) bits of the JAM byte are utilized. They are designated: GLUE JAM bit; MANDREL JAM bit; HOPPER EMPTY bit; and JAM RUNNING bit.

Figure 9:
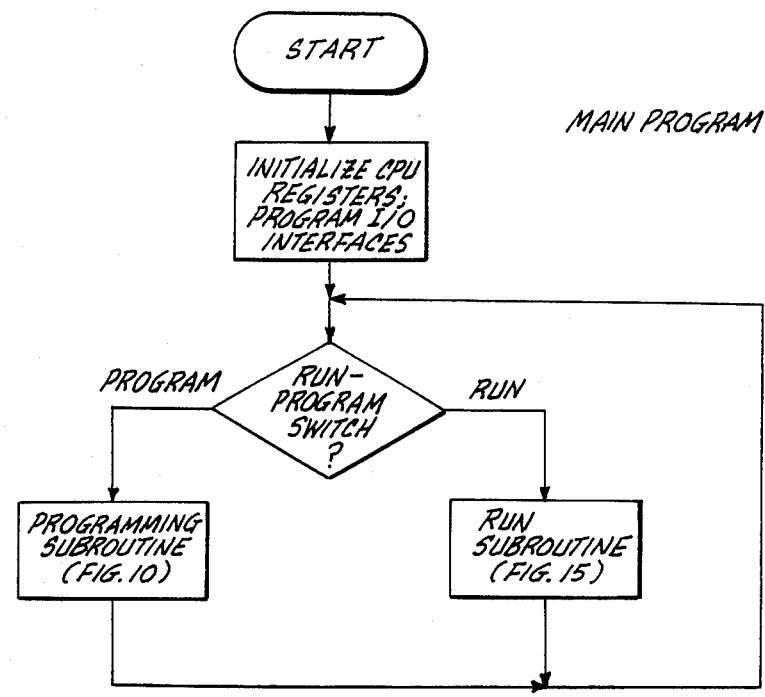
FIG. 9 is a flow diagram illustrating the main program (main sequence of operation) of the CPU illustrated in FIG. 7.

Turning now to the flow diagrams illustrated in FIGS. 9-22; FIG. 9 is a flow diagram illustrating the overall sequence of operation or main program of a preferred embodiment of a programmable tray forming machine formed in accordance with the invention. When power is applied to the machine or a power reset control switch (not shown) is actuated, the sequence illustrated in FIG. 9 starts. The first step of the sequence is the initialization of the CPU registers and the programming of the input and output (I/O) interfaces 139 and 141 (FIG. 7). The interface programming involves setting up (programming) two input/output circuits such that one functions as an input interface and the other functions as an output interface. In addition to programming the circuits such that one circuit functions as an input interface and the other as an output interface, the circuits are programmed to produce and acknowledge interrupts and function in other manners well known to those skilled in the microprocessor art. After the input and output interfaces have been programmed, a test is made to determine the status of the run-program switch 161. If the run-program switch is in the program position, a programming subroutine (illustrated in FIGS. 10–14) is entered. Contrariwise, if the run-program switch is in the run position, a run subroutine (illustrated in FIGS. 15–22) is entered.

The first step in the programming subroutine (FIG. 10) is to build up a variable table. The variable table is stored in a temporary memory such as a random access memory (RAM). The variable table is built up by reading information from permanent memory and creating a table to which is added program information inserted by the operator as it becomes available, if not available at the time the table is being built up. The table includes a section for each of four variable functions that can be programmed—mandrel dwell time, glue pattern length, box length and margin distance. Preferably, the first byte of each table section identifies the function by number. The next byte (or bytes) identifies the maximum value of the function (read from permanent memory) and the remaining byte (or bytes) stores the function value programmed by the operator in the manner hereinafter described.

In addition to the four variable functions just described, two on/off functions can be programmed. One function is the glue function and the other is the stitch function. As programmed by the operator, the glue function controls whether glue is or is not applied to a tray blank as the blank is moved by the conveyor through the glue station. As programmed by the operator, the state of the stitch function controls whether glue pattern is continuous or intermittent. Since most trays are low profile cases, a stitch glue pattern will normally not be desired. However, it can be created, if required. As a result, there are six programmable functions that can be adjusted or controlled (i.e., programmed) by the operator. Four of these are variable functions having numerical values. The other two functions—the glue and stitch—functions, are on/off functions. Which of the six functions is being programmed or observed during the programming subroutine is controlled by the state of a six state counter denoted the function counter.

Returning now to FIG. 10, the first step after the variable table is built up is to set the function counter to point to the glue function. At the same time, the function on/off and function-address flags ae cleared, i.e., set to a zero (0) state. The state of the function flags control the glue and stitch functions. The function-address flag controls the paths taken during passes through the programming subroutines in the manner hereinafter described. Following the setting of the function counter to point to the glue function and the clearing of the function/off and function-address flags, a test of the programmed variables is made to determine if any are greater than the maximum value to which they can be set. If any of the programmed variables are greater than their respective maximum value, the programmed value is set equal to zero (0). A determination that a programmed value is greater than its maximum value also indicates that the battery memory retention circuit may be failing. As a result, if any of the programmed values are found to be greater than their maximum values, the program makes a pass through a memory retention circuit test subroutine (not shown).

Figure 11:
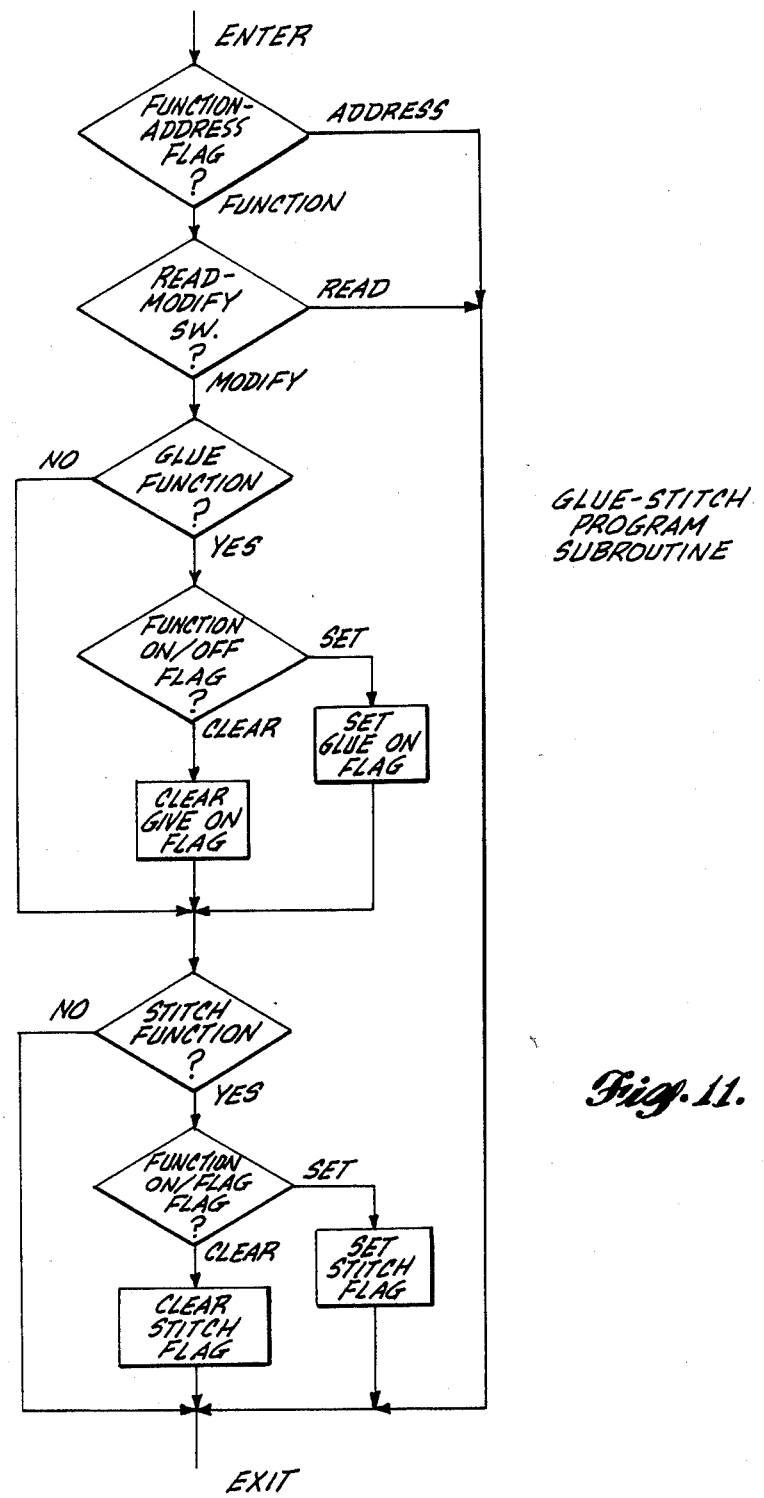
FIG. 11 is a flow diagram of a glue-stitch program subroutine suitable for use in the programming subroutine illustrated in FIG. 10.

After the programmed variables have been tested, a glue-stitch program subroutine illustrated in FIG. 11 is entered. The first step in the glue-stitch program subroutine is a test to determine the status of the function-address flag toggled by the function-address key 171 (FIG. 7) in the manner hereinafter described. If the function-address flag is in the address state, the glue-stitch program subroutine is bypassed and the programming subroutine cycles to the display-status subroutine illustrated in FIG. 12 and described below. If the function-address flag is in the function state, a test of the read-modify switch 163 is made. If the read-modify switch is in the read position, the glue-stitch program subroutine is again bypassed and the programming subroutine cycles to the display-status subroutine. If the read-modify switch 163 is in the modify state, the function counter is tested to determine if it is in the glue function state. If the function counter is in the glue function state, the state of a function on/off flag programmed in the manner hereinafter described is tested. If the function on/off flag is set a GLUE ON flag is set. Contrariwise, if the function on/off flag is clear, the GLUE ON flag is cleared. After the GLUE ON flag has been set or cleared as determined by the state of the function on/off flag, or if the function counter was not in the glue function state, the function counter is tested to determine if it is in the stitch function state. If the function counter is in the stitch function state, the function on/off flag is tested. In this case, the status of the function on/off flag relates to the stitch function, whereas in the previous situation the status of the function on/off flag related to the glue function. In any event, if the function on/off flag is set, a STITCH flag is set. Contrariwise, if the function on/off flag is clear, the STITCH flag is cleared. After the STITCH flag has been set or cleared, or if the function counter is not in the stitch function state, the programming subroutine cycles to the display-status subroutine illustrated in FIG. 12 and next described.

The first step in the display-status subroutine is a test of the state of the function-address flag. If the function-address flag is in the function state, the program "points" to the function counter. As noted above, the state of the function counter relates to the programmable machine function. In the preferred embodiment of the programmable tray forming machine herein described there are six functions, all of which have been referred to above. They are: the glue function; the stitch function; the tray length function; the glue pattern length function; the margin distance function; and, the mandrel dwell time function. The first two functions (e.g., the glue and stitch functions) are on/off functions. The latter four functions (e.g., the tray length, glue pattern length, margin distance and mandrel dwell time functions) are numerical value functions. In any event, because there are six programmable functions, the function counter can be sent to any one of six possible numerical states—0, 1, 2, 3, 4 and 5.

After the program "points" to the function counter, the program "points" to a display bin in permanent memory based on the state of the function counter. Permanent memory, which may be in the form of a read-only memory (ROM) or a varation thereof, such as a programmable read-only memory (PROM) or an erasable programmable read-only memory (EPROM), stores in the pointed to bin data suitable for creating a display of the function related to the function counter value, such as GLUE to denote the glue function; STCH to denote the stitch function; PATL to denote the glue pattern length function; BOXL to denote the tray length function; FLAP to denote the margin distance function; and, MAND to denote the mandrel dwell time function. The pointed to function is then displayed.

After the command to display the pointed to function has occurred, a test is made to determine if the function is the glue or stitch function. If the function is neither the glue or stitch function, the status light 167 on the control/display unit 135 is turned off (or commanded to remain off). If the function is either the glue function or the stitch function as determined by the state of the function counter, a test is made to determine whether the related flag is set. If the related flag is not set, the status light 167 is again turned off (or commanded to remain off). Contrariwise, if the related flag is set, the status light is turned on (or commanded to remain on). Thereafter, the programming subroutine cycles to the program key press test of the programming subroutine illustrated in FIG. 10 and described below.

Figure 12:
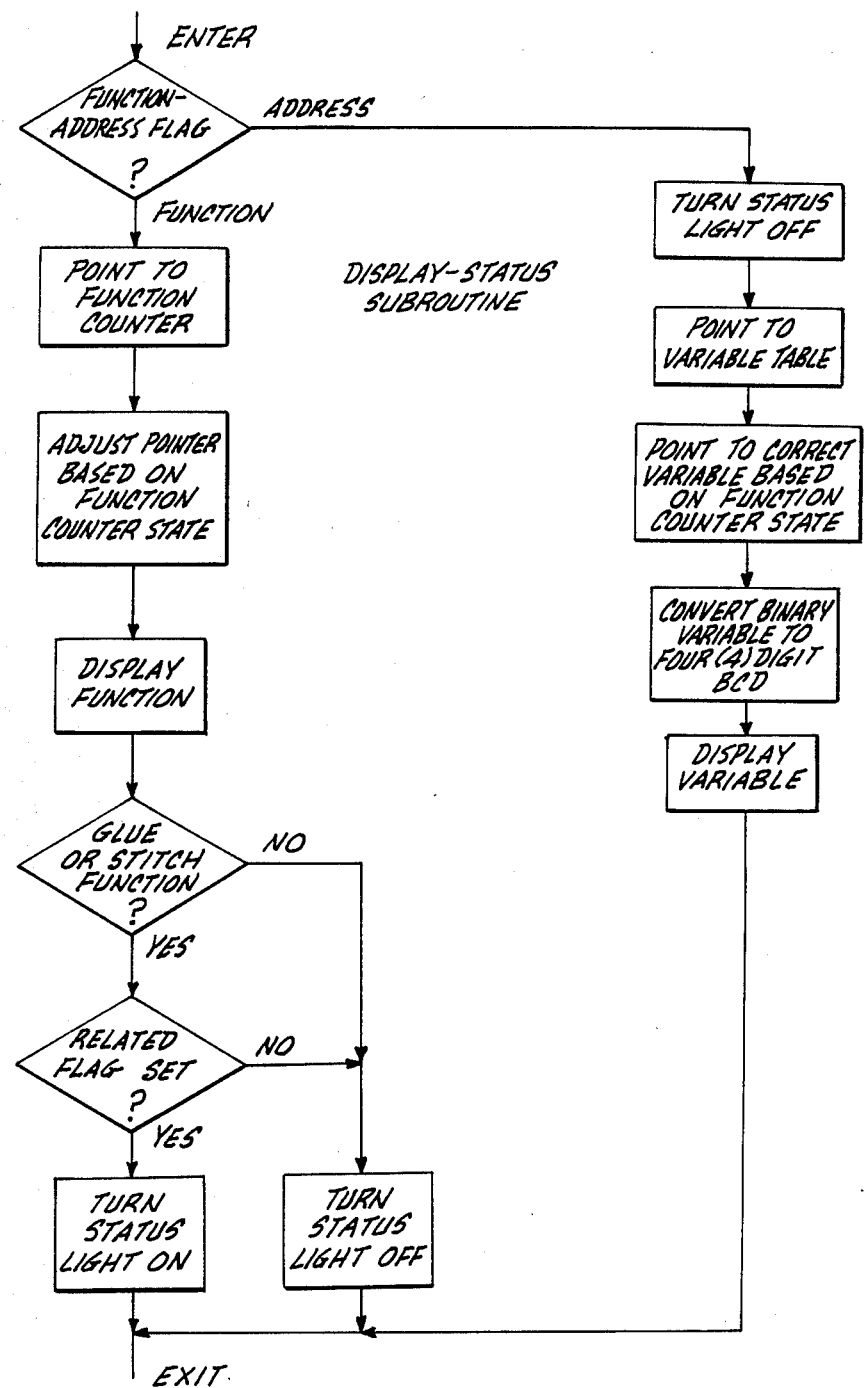
FIG. 12 is a flow diagram of a display-status subroutine suitable for use in the programming subroutine illustrated in FIG. 10.

If the function-address flag test that occurs when the display-status subroutine is entered determines that the function-address flag is in the address state, the path illustrated on the right side of FIG. 12 is followed. The first step in this path is to turn off the status light (or command the status light to remain off). The status light is turned off because the status light state is related only to the stitch and glue functions and the information to be displayed when the right side path is followed relates to the functions programmed with numerical values—the tray length function, the glue pattern length function, the margin distance function and the dwell time function. After the status light is turned off, the program points to the variable table (as noted above, the variable table contains the programmed numerical value for the functions that can be programmed with numerical values). Thereafter, the program adjusts the pointer to point to the correct variable based on the function counter value. That is, if the function counter is set to the tray length function, the tray length function is pointed to. Similarly, if the function counter is pointing to the glue pattern length function, the margin distance function or the mandrel dwell time function, the appropriate function is pointed to. Then, the program value of the "pointed to" variable is read out and converted from pure binary form to four (4) digit binary coded decimal (BCD) form. The BCD value is then used to create a decimal display of the programmed value of the "pointed to" variable. As described below, the programmed values are changed, i.e., incremented and decremented, during passes through the countdown and count-up subroutines illustrated in FIGS. 13 and 14. After the programmed value has been displayed, the display-status subroutine terminates and the sequence of operation cycles to the point in the programming subroutine illustrated in FIG. 10 where the program key press test takes place.

Figure 10:
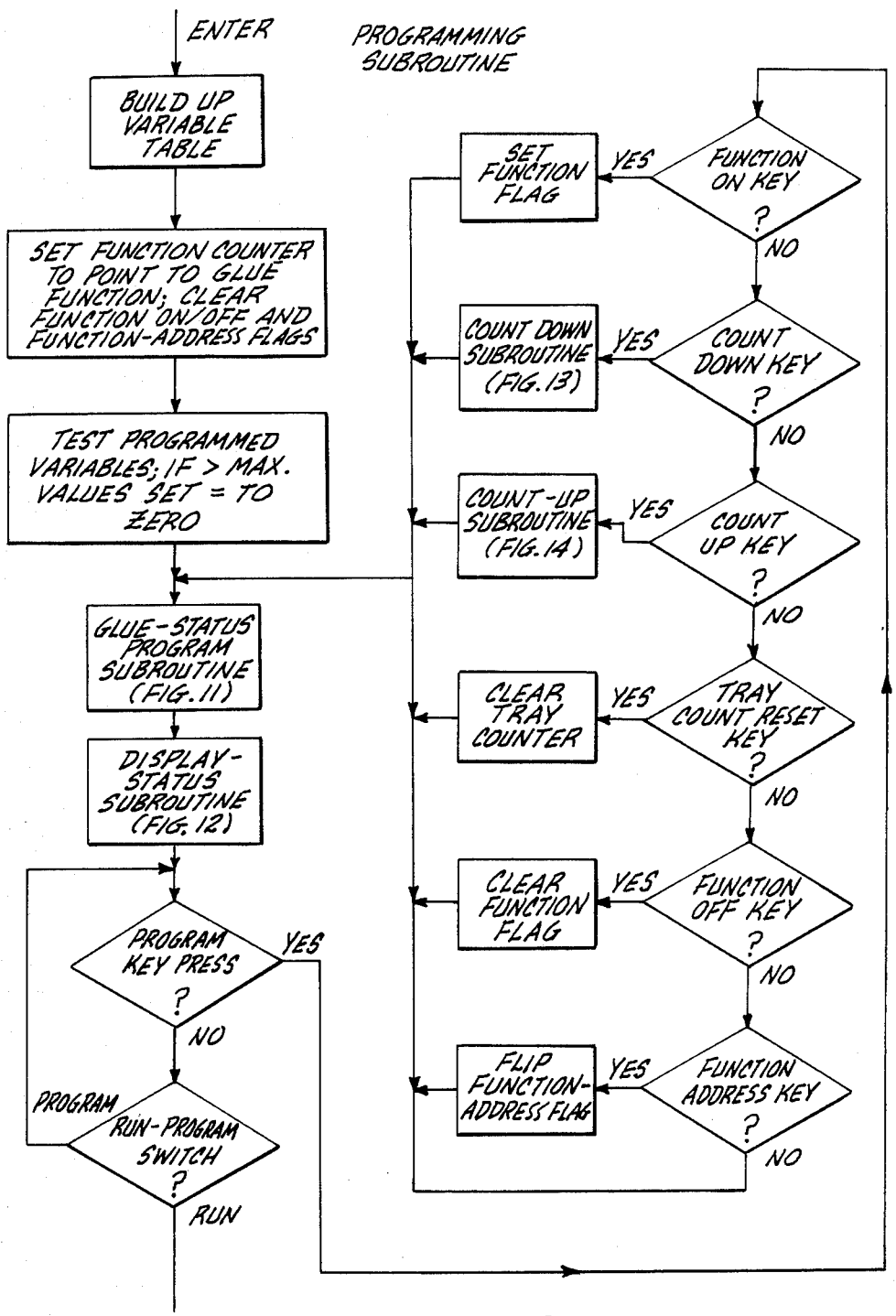
FIG. 10 is a flow diagram of a programming subroutine suitable for use in the main program illustrated in FIG. 9.

After a pass through the display-status subroutine (FIG. 12) has occurred, as illustrated in FIG. 10, the program key press test is made. The program key press test is a test of all of the progress keys 165 to determine if any key is being actuated (e.g., pressed). If a program key is being pressed, sequential tests are made to determine which one of certain ones of the program keys is being pressed. If one of the tested keys is pressed, the action commanded by the press or actuated key occurs. The key tests and actions that occur are illustrated on the right side of FIG. 10 and next described.

First, a test is made to determine if the function on key 175 is being pressed. If the function on key is being pressed, the function on/off flag is set. Thereafter, the programming subroutine cycles to the point where the glue-stitch program subroutine is entered. If the function on key is not being pressed, a test is made to determine if the countdown key 183 is being pressed. If the countdown key is being pressed, the countdown subroutine illustrated in FIG. 13 is entered.

Figure 13:
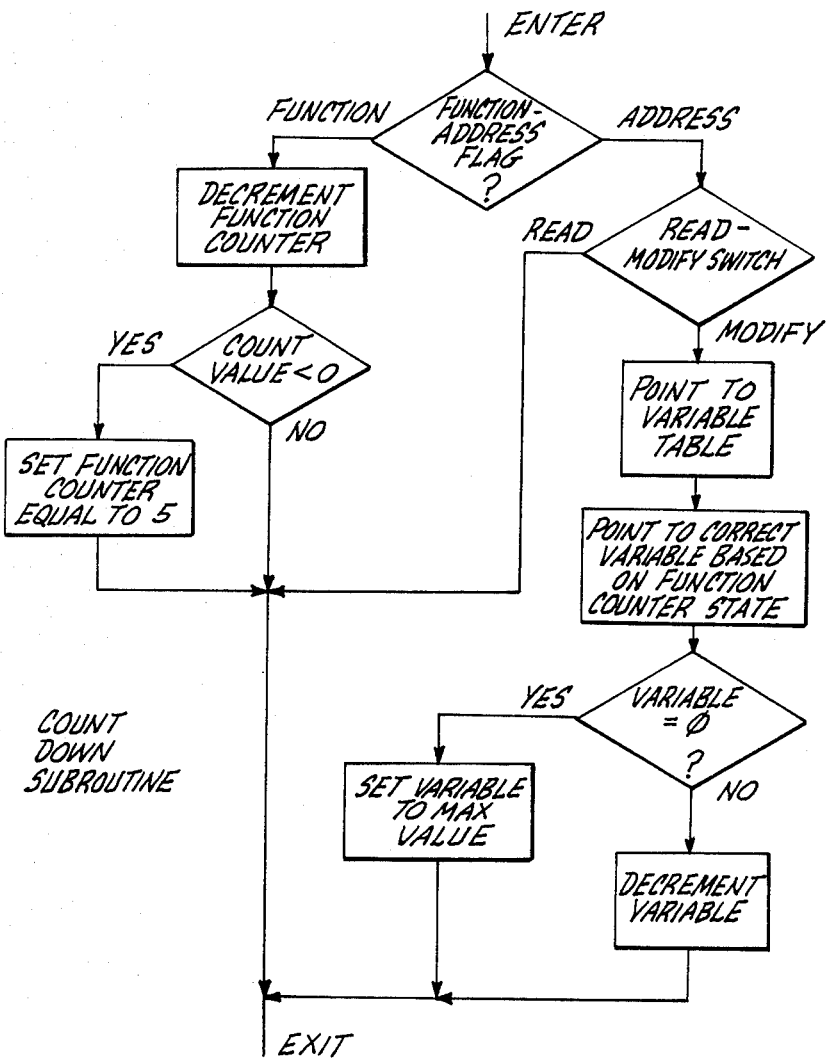
FIG. 13 is a flow diagram of a countdown subroutine suitable for use in the programming subroutine illustrated in FIG. 10.
Figure 14:
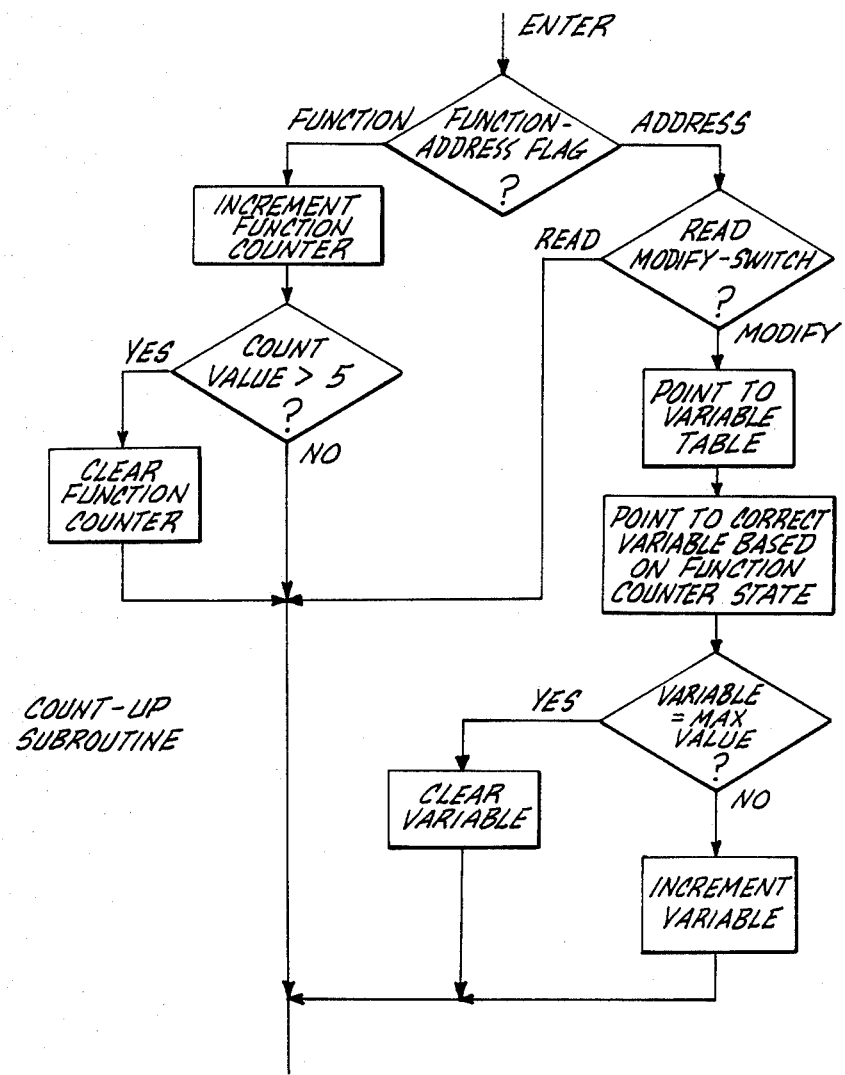
FIG. 14 is a flow diagram of a count-up subroutine suitable for use in the programming subroutine illustrated in FIG. 10.

The first step in the countdown subroutine illustrated in FIG. 13 is a test of the function-address flag. If the function-address flag is in the function state, the function counter is decremented. Then, a test is made to determine if the count value of the function counter is less than zero. If the count value of the function counter is not less than zero, the countdown subroutine terminates and the sequence of operation cycles to the point in the programming subroutine where the glue-stitch subroutine is entered, as illustrated in FIG. 10. If the status of the function counter is less than zero, the function counter is equal to its maximum value—five (5). As noted above, the function counter maximum numerical value is five because the herein described embodiment of a programmable tray forming machine formed in accordance with the invention has six functions. Thereafter, the countdown subroutine ends and the sequence of operation cycles to the point in the programming subroutine where the glue-stitch program subroutine is entered.

If the function-address flag is in the address state when the countdown subroutine is entered, the state of the read-modify switch is tested. If the ready-modify switch is in the read position, the countdown subroutine ends and the sequence of operation cycles to the point in the programming subroutine (FIG. 10) where the glue-stitch program subroutine is entered. If the read-modify switch is in the modify position, the program "points" to the variable table. Thereafter, the program "points" to the correct variable based on the status of the function counter. Then, the programmed value of the variable is tested to determine if it is equal to zero. If the programmed value of the "pointed to" variable is not equal to zero, the programmed value is decremented and the result becomes a new programmed value for the "pointed to" variable. If the programmed value is equal to zero, the programmed value is set equal to the maximum value, which was read from permanent memory and stored in the variable table when the table was set up, as previously described. Thereafter, the countdown subroutine ends and the sequence of operation cycles to the point in the programming subroutine where the glue-stitch program subroutine is entered.

If the countdown key is not being pressed when the countdown key test takes place, then, as shown in FIG. 10, a test of the count-up key is made to determine if the count-up key is being pressed. If the count-up key is being pressed, a count-up subroutine (illustrated in FIG. 14) is entered.

The first step in the count-up subroutine is a test of the function-address flag. If the function-address flag is in the function state, the function counter is incremented. Then, the function counter is tested to determine if its value is greater than five (5). If greater than five (5), the function counter is cleared, i.e., set equal to zero (0). After the function counter has been tested and cleared, if necessary, the count-up subroutine ends and the sequence of operation cycles to the point in the programming subroutine (FIG. 10) where the glue-stitch program subroutine is entered.

If the function-address flag is in the address state when the count-up subroutine is entered, the read-modify switch is tested. If the read-modify switch is in the read position, the count-up subroutine ends and the sequence of operation cycles to the glue-stitch program subroutine. If the read-modify switch is in the modify position, the program "points to" the variable table, and, then, to the correct variable based on the state of the function counter. If the function counter state is the glue pattern length state, the glue pattern length variable is pointed to. Contrariwise, if the function counter is in the tray length, margin distance or mandrel dwell time state, the related state is pointed to. (The glue and stitch function counter states point to no variables since none exist.) After the correct variable is pointed to, the programmed value of the variable is tested to determine if it is equal to the maximum value of the pointed to variable. If the programmed value is equal to the maximum value, the programmed value is cleared, i.e., set equal to zero (0). Alternatively, if the programmed value is not equal to the maximum value, the programmed value is incremented. The incremented value then forms a new programmed value. After the programmed value has been changed, the count-up subroutine ends and the sequence of operation cycles to the point in the programming subroutine where the glue-stitch program subroutine is entered, as illustrated in FIG. 10.

If the count-up key test determines that the count-up key 181 is not being pressed, a test is made to determine if the tray count reset key 177 is being pressed. If the tray count reset key is being pressed, a tray counter (which is incremented each time a tray is formed when the machine is in the run mode of operation, as hereinafter described) is cleared. After the tray counter is cleared, the sequence of operation cycles to the point where the glue-stitch program subroutine is entered.

If the tray count reset key is not being pressed, a test is made to determine if the function off key 173 is being pressed. If the function off key is being pressed, the function on/off flag is cleared and the sequence of operation cycles to the point where the glue-stitch subroutine is entered, as illustrated in FIG. 10. If the function off key is not being pressed, a test is made to determine if the function-address key 171 is being pressed. If the function-address key is being pressed, the function-address flag is toggled, i.e., changed from the function state to the address state or from the address state to the function state. After the function-address flag has been toggled, or if the function-address key test is negative, the sequence of operation cycles to the point where the glue-stitch subroutine is entered.

Turning now to the portion of the overall sequence illustrated in the lower left-hand corner of FIG. 10; if the program key press test is negative, i.e., no key is being pressed, a test of the run-program switch 161 is made. If the run-program switch is in the program position, the overall sequence cycles back to the point where the program key press test is made. This loop is repeated until a program key is pressed or the run-program switch 161 is shifted to the run position. When the test of the run-program switch 161 determines that the switch has been shifted to the run position, the wait loop just described is left and the sequence of operation cycles to the main program illustrated in FIG. 9.

Figure 15:
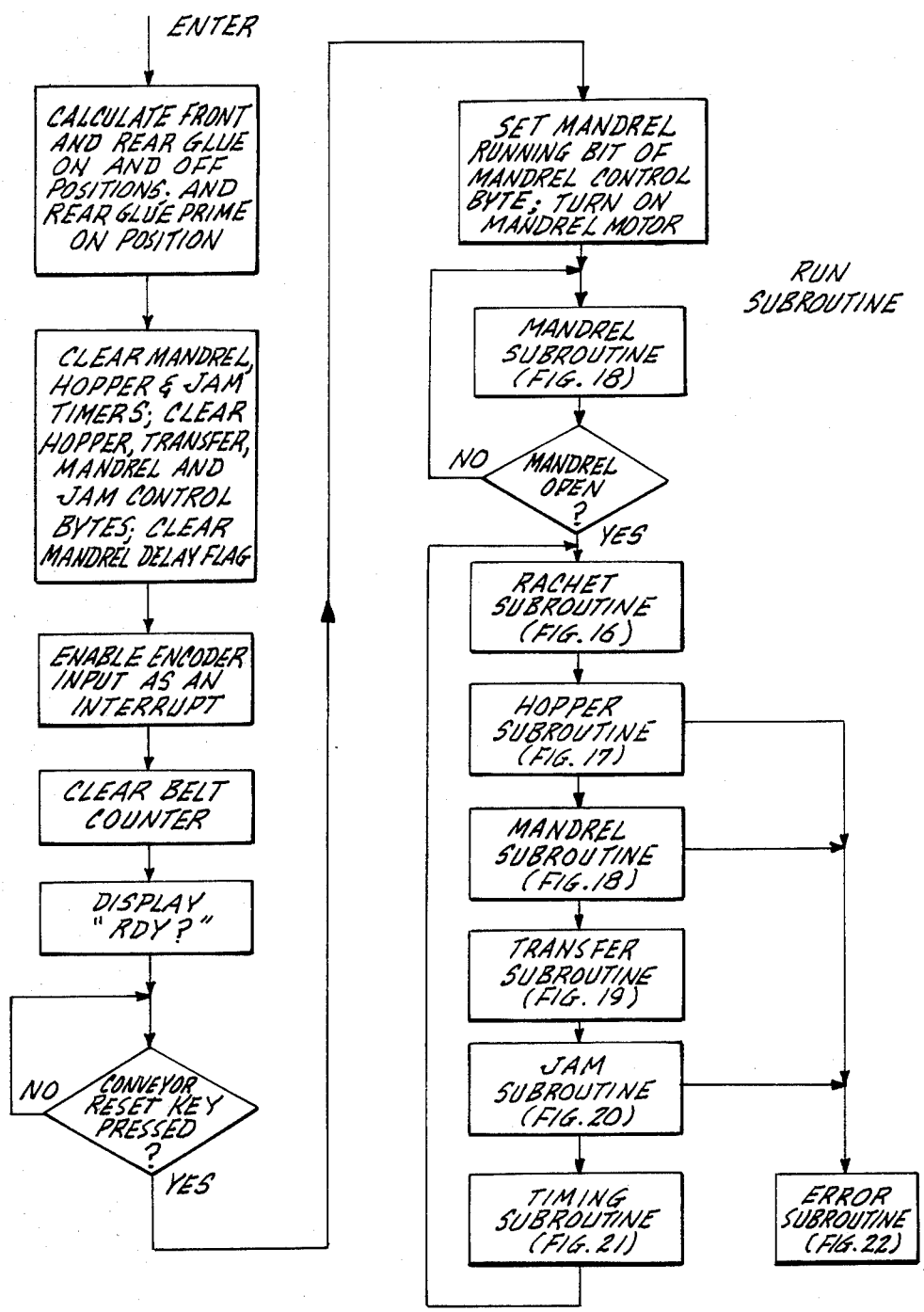
FIG. 15 is a flow diagram of a run subroutine suitable for use in the main program illustrated in FIG. 9.

When a test of the run-program switch, made during a pass through the main program sequence illustrated in FIG. 9, determines that the run-program switch is in the run state, the run subroutine illustrated in FIG. 15 is entered. The first step in the run subroutine is to calculate front and rear glue-on and off positions and a rear glue prime-on position. These position values are ultimately used to control the turning on and turning off of the glue head 81; and, control the priming of the glue head prior to the head emitting glue when a tray blank reaches the rear glue position. In this regard, the front glue-on position is the position where glue is first emitted onto the side major flap 17 (FIG. 1) adjacent to the leading edge of the tray blank passing through the glue station. The front glue-off position is, of course, the position at which the glue stops being applied to the leading edge side major flap 17. The rear glue-on position is the position at which glue is first emitted onto the side major flap 17 adjacent to the trailing edge of a tray blank passing through the glue station. And, of course, the rear glue-off position is the position at which glue stops being applied to the trailing edge side major flap. The rear glue prime on position is the position at which the glue prime pump is energized prior to the tray blank reaching the rear glue on position. (The front glue prime on position is controlled in a different manner, as described below.)

The front and rear glue on and off position and the rear glue prime on position calculations are made utilizing the box length, glue pattern length and margin distance information programmed by the operator. More specifically, the front glue-on position is the margin distance value. The margin distance value is a value inserted by the operator that defines the distance from the leading edge to the glue-on position. If no margin distance is programmed by the operator, the glue-on position is the zero (0) or leading edge position of the moving tray blank. The front glue-off position is the front glue-on position plus the glue pattern length distance programmed by the operator. The rear glue prime-on position is the front glue-off position plus a predetermined amount of distance value preprogrammed into the machine. The rear glue-off position is the box length value programmed by the operator minus the margin distance value, if any has been programmed. The rear glue-on position is the rear glue-off position minus the glue pattern length distance programmed by the operator. While described in terms of distance values, in actually, the position information is actually calculated in accordance with encoder pulse values, each of which may, for example, equal 0.1 inches of belt travel. Hence, the various position information is stored in conveyor position form, rather than actual distance form. As hereinafter described, the calculated count values are compared with a counter value incremented as a tray blank is moved through the glue station. When a comparison occurs, the requisite action takes place, i.e., glue is turned on or turned off, or glue prime is turned on.

After the front and rear glue-on and off positions and the rear glue prime on position have been calculated, three timers denoted the mandrel, hopper and jam timers are cleared. The purpose of these timers is described below. Further, the HOPPER, TRANSFER, MANDREL and JAM control bytes (FIG. 8) are all cleared. That is, all of the bits of these bytes are cleared by setting them low. Finally, a mandrel delay flag is cleared. Then, the input interface is programmed to enable any encoder inputs to interrupt the normal operation of the run program. Consequently, encoder inputs are immediately recognized in a manner well known to those skilled in the programming art. Finally, a belt counter is cleared and, then, the alphanumeric display creates a ready (RDY?) display.

After the ready display has been created, the conveyor reset key 179 is tested to determine if it is pressed. This test is repeated until the key has been pressed. That is, the run subroutine cycles until the conveyor reset key is pressed. After the conveyor reset key is pressed, the MANDREL RUNNING bit of the MANDREL control byte is set; and, the mandrel motor is turned on. Thereafter, a pass is made through the mandrel subroutine illustrated in FIG. 18 and described below. In essence, this pass is made to clear the mandrel and eject any tray located at the mandrel station by pressing it through the forming die 93.

Figure 22:
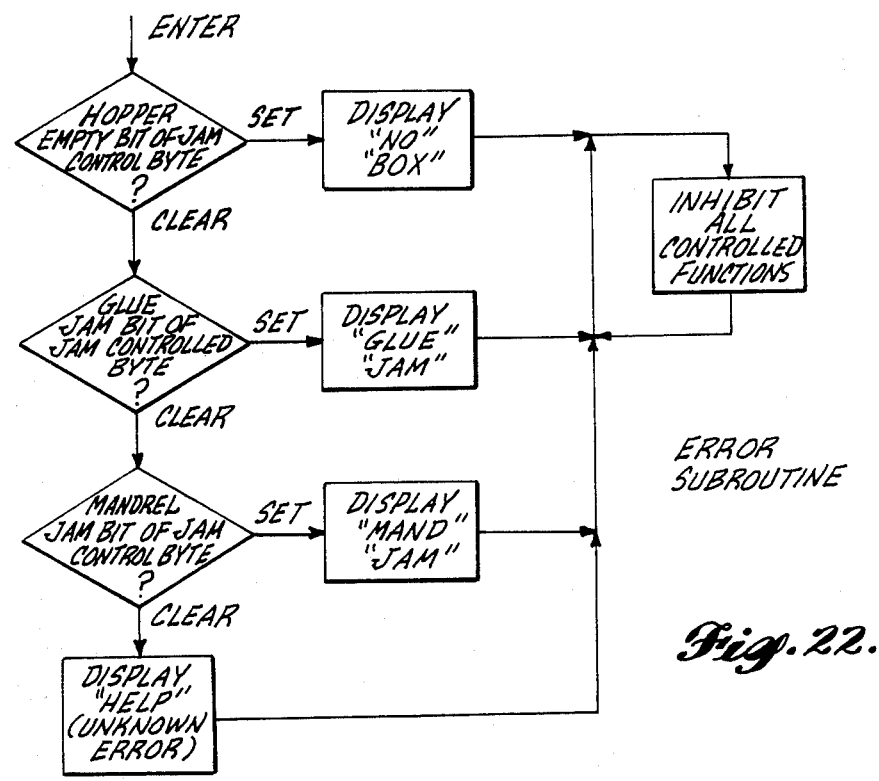

After the pass has been made through the mandrel subroutine, a test is made to determine if the mandrel is open. This test is accomplished by testing the MANDREL OPEN bit to determine if it is set. As long as the MANDREL OPEN bit remains clear, continuous passes are made through the mandrel subroutine. When the mandrel is retracted and the MANDREL OPEN bit is set, the run subroutine cycles to the ratchet subroutine illustrated in FIG. 16 and described below. Thereafter, sequential passes are made through the hopper subroutine, the mandrel subroutine, the transfer subroutine, the jam subroutine and the timing subroutine. After the timing subroutine, the run subroutine cycles back to the beginning of the ratchet subroutine. Thereafter, sequential passes are made through the ratchet, hopper, mandrel, transfer, jam and timing subroutines. In the event a jam or some error occurs during any pass through the hopper, mandrel or jam subroutines, an error subroutine illustrated in FIG. 22 is entered. The ratchet, hopper, mandrel, transfer, jam timing and error subroutines are next described.

The first step in the ratchet subroutine (FIG. 16) is a test of the hopper detect switch 143 to determine if it is open or closed. If the hopper detect switch is closed, indicating that a tray blank is located close enough to the conveyor to be picked up by the vacuum cups 65 when they are moved toward the hopper, the ratchet mechanism is turned off. Simultaneously, the PULL and PUSH bits of the HOPPER control byte are cleared and a BLANK AVAILABLE flag is set. Further, the hopper timer is set to zero. Thereafter, the run subroutine cycles to the hopper subroutine illustrated in FIG. 17 and described below.

If the hopper detect switch is open when the ratchet subroutine is entered, indicating that a tray blank is not close enough to the conveyor to be picked up by the vacuum cups when the vacuum cups are extended toward the hopper in the manner previously described, the PUSH bit of the HOPPER control byte is tested. If the PUSH bit of the HOPPER control byte is set, the hopper timer is tested to determine if it is equal to zero (0). As will be better understood from the following description, the hopper timer is decremented during passes through the timing subroutine. If the hopper timer is equal to zero (0), the BLANK AVAILABLE flag control byte is cleared. Thereafter, the hopper subroutine is entered. If the hopper timer value is equal to zero (0), the PULL bit of the HOPPER control byte is set and the PUSH bit of the HOPPER control byte is cleared. Thereafter, the hopper timer is reset to a predetermined numerical value (from which it is counted down during passes through the timing subroutine); and, the ratchet is turned off. The ratchet is turned off by deactivating the hopper ratchet actuator 191 (FIG. 7). Thereafter, the BLANK AVAILABLE flag is cleared (or commanded to remain clear) and the run subroutine cycles to the hopper subroutine illustrated in FIG. 17 and described below.

If the PUSH bit of the HOPPER control byte is found to be clear, rather than set, when tested after the hopper detect switch is found to be open, the PULL bit of the HOPPER control byte is tested. If the PULL bit of the HOPPER control byte is found to be clear, the PUSH bit of the HOPPER control byte is set. Thereafter, the hopper timer is set to a predetermined value and, then, the ratchet is turned on by energizing the hopper ratchet actuator 191. After these steps have occurred, the BLANK AVAILABLE flag is cleared (or commanded to remain clear) and, then, the run subroutine cycles to the hopper subroutine.

If the PULL bit of the HOPPER control byte is found to be set, rather than clear, the hopper timer is tested to determine if it is equal to zero. If the hopper timer is not equal to zero, the BLANK AVAILABLE flag is cleared (or commanded to remain clear) and the run subroutine cycles to the hopper subroutine illustrated in FIG. 17. Contrariwise, if the hopper timer value is equal to zero, the PUSH and PULL bits of the HOPPER control byte are cleared. Thereafter, a hopper counter is incremented. The hopper counter is a counter that is tested during the hopper subroutine in the manner hereinafter described. After the hopper counter has been incremented, the BLANK AVAILABLE flag is cleared (or commanded to remain clear); and, then, the run subroutine cycles to the hopper subroutine illustrated in FIG. 17 and described below.

Figure 16:
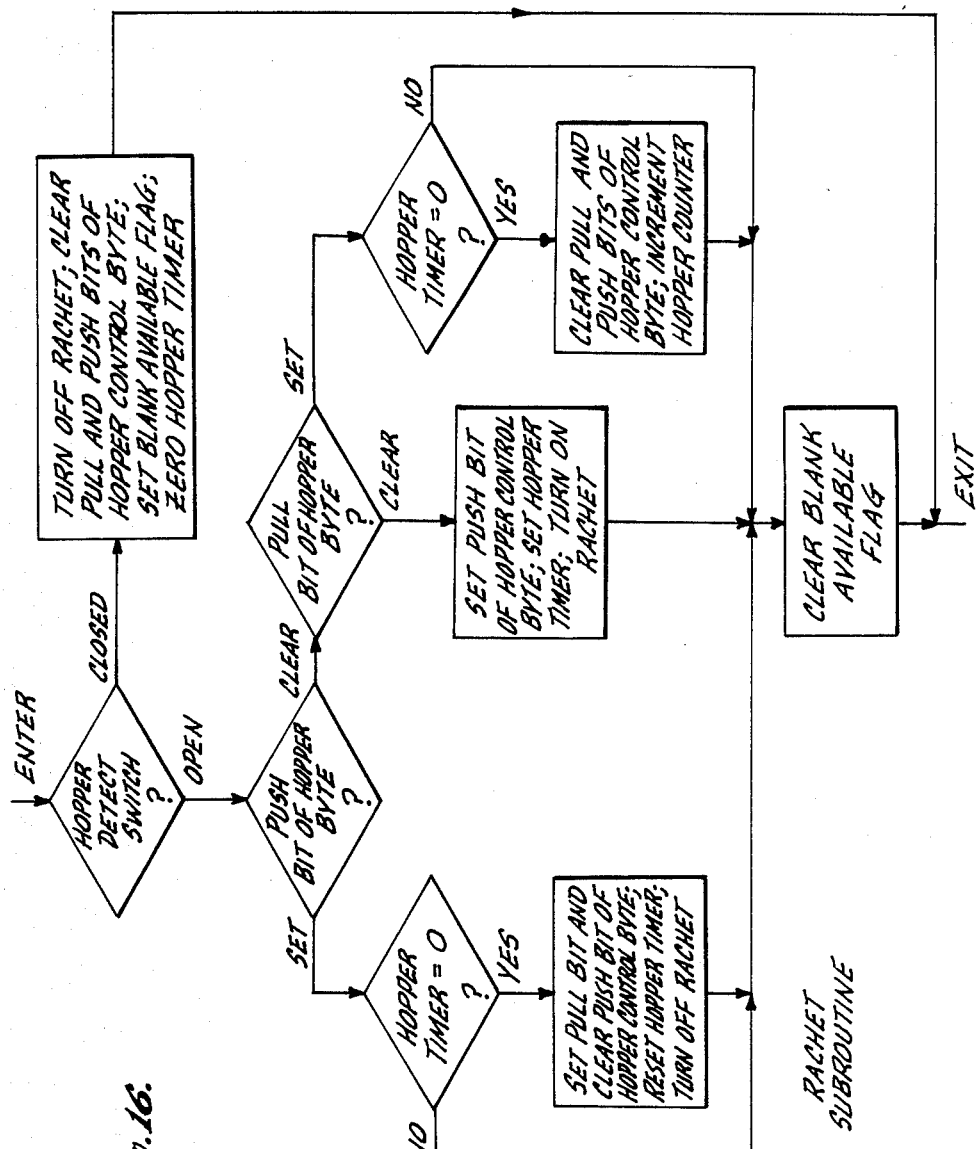
FIG. 16 is a flow diagram of a ratchet subroutine suitable for use in the run subroutine illustrated in FIG. 15.

As will be readily understood by those familiar with ratchet mechanisms from the foregoing description, what occurs during passes through the ratchet subroutine, assuming the hopper detect switch is open, is an alternate energization and degenerization of the hopper-ratchet actuator. In this regard, initially, the hopper is loaded with a supply of tray blanks. After a certain number of tray blanks have been removed from the hopper, the hopper detect switch changes from a closed state to an open state. While the hopper detect switch was in the closed state, the PUSH and PULL bits of the HOPPER control byte were maintained clear as passes were made through the first path described above. As a result, the first pass made through the ratchet subroutine after the hopper detect switch opens follows the middle one of the three paths illustrated in FIG. 16. This results in the PUSH bit being set, the hopper timer being set and the ratchet being turned on. During the next and subsequent passes through the ratchet subroutine, up until the hopper timer is decremented to zero (0), no further action occurs. When the hopper timer is decremented to zero (0), the PULL bit of the HOPPER control byte is set and the PUSH bit is cleared. At the same time, the hopper timer is reset to another value from which it is to be decremented. At the same time, the ratchet is turned off. As a result, the pulled pawl of the ratchet mechanism is allowed to return in a conventional manner to its quiescent position. During the next and subsequent passes through the ratchet subroutine, the right-most path illustrated in FIG. 16 is followed, whereby no action occurs until the hopper timer decrements to zero. When the hopper timer decrements to zero, the PULL and PUSH bits of the HOPPER control byte are cleared and the hopper counter is incremented. During the following pass through the ratchet subroutine, if the hopper detect switch is still open, the midpath is again followed and the entire sequence repeated. As a result, until the hopper detect switch is closed, the ratchet mechanism is alternately actuated and deactuated and the hopper counter incremented.

Figure 17:
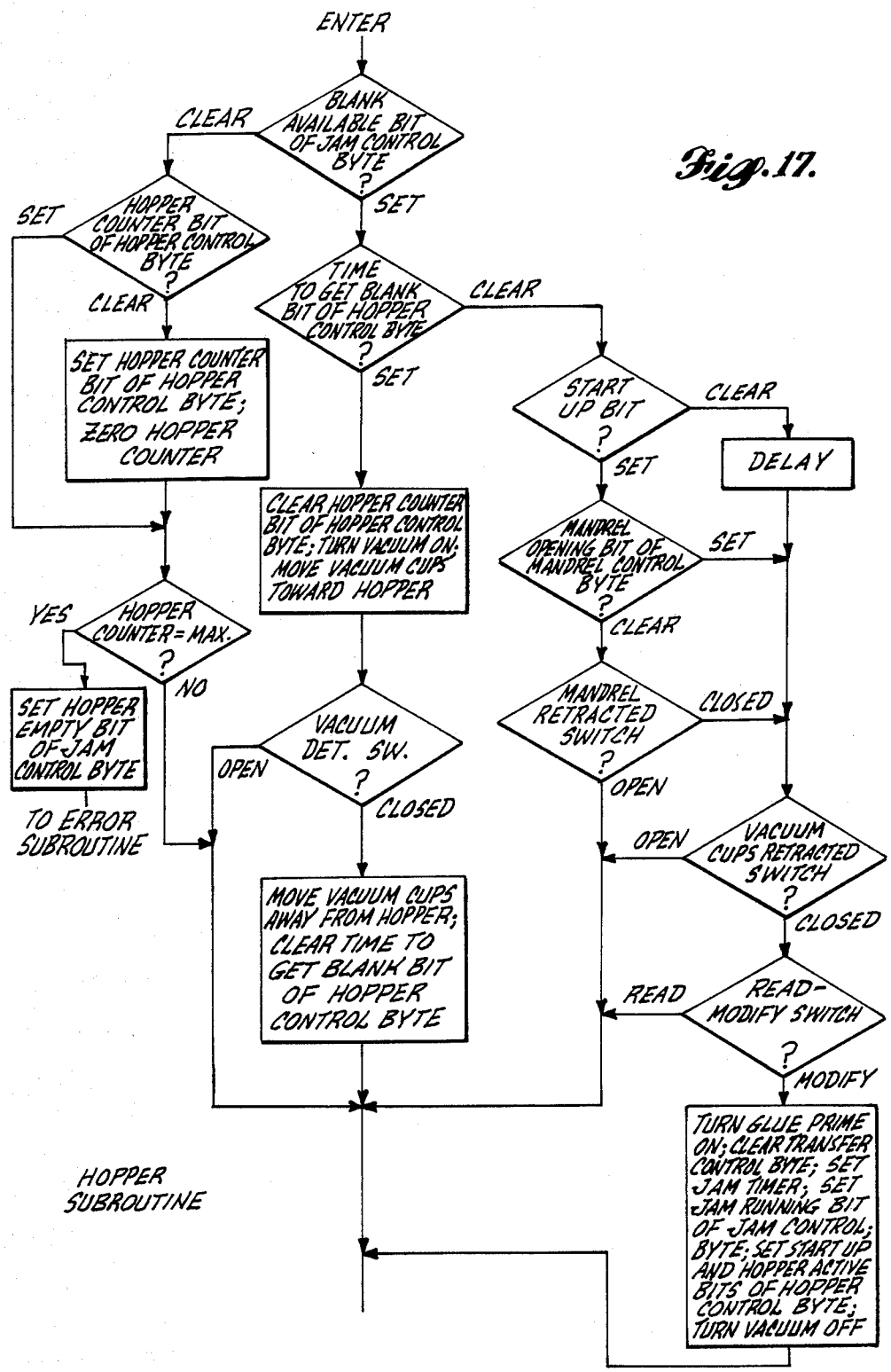
FIG. 17 is a flow diagram of a hopper subroutine suitable for use in the run subroutine illustrated in FIG. 15.

The first step in the hopper subroutine illustrated in FIG. 17 is a test of the BLANK AVAILABLE flag. If the BLANK AVAILABLE flag is clear, indicating that no tray blank is available, the HOPPER COUNTER bit of the HOPPER control byte is tested. If the HOPPER COUNTER bit is clear, the HOPPER COUNTER bit of the HOPPER control byte is set. At the same time, the hopper counter is zeroed. As a result, the first pass through the hopper subroutine (after the BLANK AVAILABLE flag has been cleared during a pass through the ratchet subroutine), results in the HOPPER COUNTER bit of the HOPPER control byte being set and the hopper counter being zeroed. During subsequent passes through the hopper subroutine while the BLANK AVAILABLE flag remains clear, the HOPPER COUNTER bit test determines that this bit is set, whereby the zeroing of the hopper counter step is bypassed. After the hopper counter has been zeroed, or when this step is bypassed, the hopper counter is tested to determine if it has reached a preprogrammed maximum value stored in permanent memory. If the hopper counter reaches its maximum value, the HOPPER EMPTY bit of the JAM control byte is set and the error subroutine illustrated in FIG. 22 and described below is entered. As a result, after the ratchet mechanism has gone through a predetermined number of cycles of operation determined by the preprogrammed hopper counter maximum value, it is presumed that the hopper is empty, causing the run subroutine to cycle to the error subroutine, resulting in the creation of a hopper empty display, as hereinafter described. As long as the hopper counter does not reach its maximum value, the run subroutine cycles to the mandrel subroutine illustrated in FIG. 18 and described below.

If the BLANK AVAILABLE flag is set when the hopper subroutine is entered, the TIME-TO-GET BLANK bit of the HOPPER control byte is tested. If the TIME-TO-GET BLANK bit of the HOPPER control byte is set, the HOPPER COUNTER bit of the HOPPER control byte is cleared; and, vacuum is turned on by energizing the vacuum on/off actuator 197 (FIG. 7). At the same time, the vacuum cups are moved toward the hopper by actuating the vacuum cup in/out actuator 69. Thereafter, the vacuum detect switch 145 (FIG. 7) is tested during passes through the hopper subroutine. As long as the vacuum detect switch remains open, meaning that the vacuum cups have not contacted a tray blank, the run subroutine cycles to the mandrel subroutine (illustrated in FIG. 18 and described below) after each vacuum detect switch test. When the vacuum detect switch closes as a result of the vacuum cups impinging on a tray blank, the vacuum cups are moved away from the hopper by reversing the direction of actuation of the vacuum cup in/out actuator 68. At the same time, the TIME-TO-GET BLANK bit of the HOPPER control byte is cleared; and, then, the run subroutine cycles to the mandrel subroutine illustrated in FIG. 18.

If the TIME-TO-GET BLANK bit of HOPPER control byte test determines that this bit is clear, the START-UP bit of the HOPPER control byte is tested. If the START-UP bit is clear, a delay occurs. The START-UP bit is only clear when the tray blank is the first tray blank. After the first tray blank is moved to the conveyor the START-UP bit is set in the manner described below. Thereafter, the delay is avoided.

A set START-UP bit causes a test of the MANDREL OPEN bit of the MANDREL control byte. If the MANDREL OPEN bit is set, or after the delay occurs, the hopper subroutine cycles to a vacuum cups retracted switch test. Contrariwise, if the MANDREL OPEN bit of the MANDREL control byte is clear, the mandrel retracted switch is tested to determine if it open or closed. If the mandrel retracted switch is closed, the vacuum cups retracted switch test occurs. Contrariwise, if the mandrel retracted switch is open, the run subroutine cycles to the mandrel subroutine illustrated in FIG. 18 and described below.

After the delay, or if the MANDREL OPEN bit of the MANDREL control byte is found to be set, or if the mandrel retracted switch is found to be closed, as noted above, the vacuum cups retracted switch test occurs. If the vacuum cups retracted switch is open, meaning that the vacuum cups are extended to some degree, the sun subroutine cycles to the mandrel subroutine illustrated in FIG. 18. If the vacuum cups retracted switch is closed, the read-modify switch is tested. If the read-modify switch is in the read position, the run subroutine cycles to the mandrel subroutine. Contrariwise, if the read-modify switch is in the modify state, the glue prime is turned on. Further, the TRANSFER control byte is cleared; the jam timer is set to a predetermined value; and, the JAM RUNNING bit of the JAM control byte is set. Further, the START-UP and HOPPER ACTIVE bits of the HOPPER control byte are set. (As noted above, setting of the START-UP bit of the HOPPER control byte avoids the previously described delay.) Finally, the vacuum previously applied to the vacuum cups is turned off, allowing the tray blank being held by the vacuum cups to drop onto the conveyor in the manner previously described.

As will be readily appreciated from the foregoing description, a tray blank is only allowed to drop onto the conveyor when the mandrel is open or opening and the vacuum cups are retracted. If the mandrel is pausing in dwell time or closing, or the vacuum cups are being moved toward or away from the hopper, a tray blank dropping does not occur. As a result, tray blanks cannot drop onto the conveyor while the mandrel is operating on a prior tray blank or before the tray blank reaches the conveyor.

Figure 21:
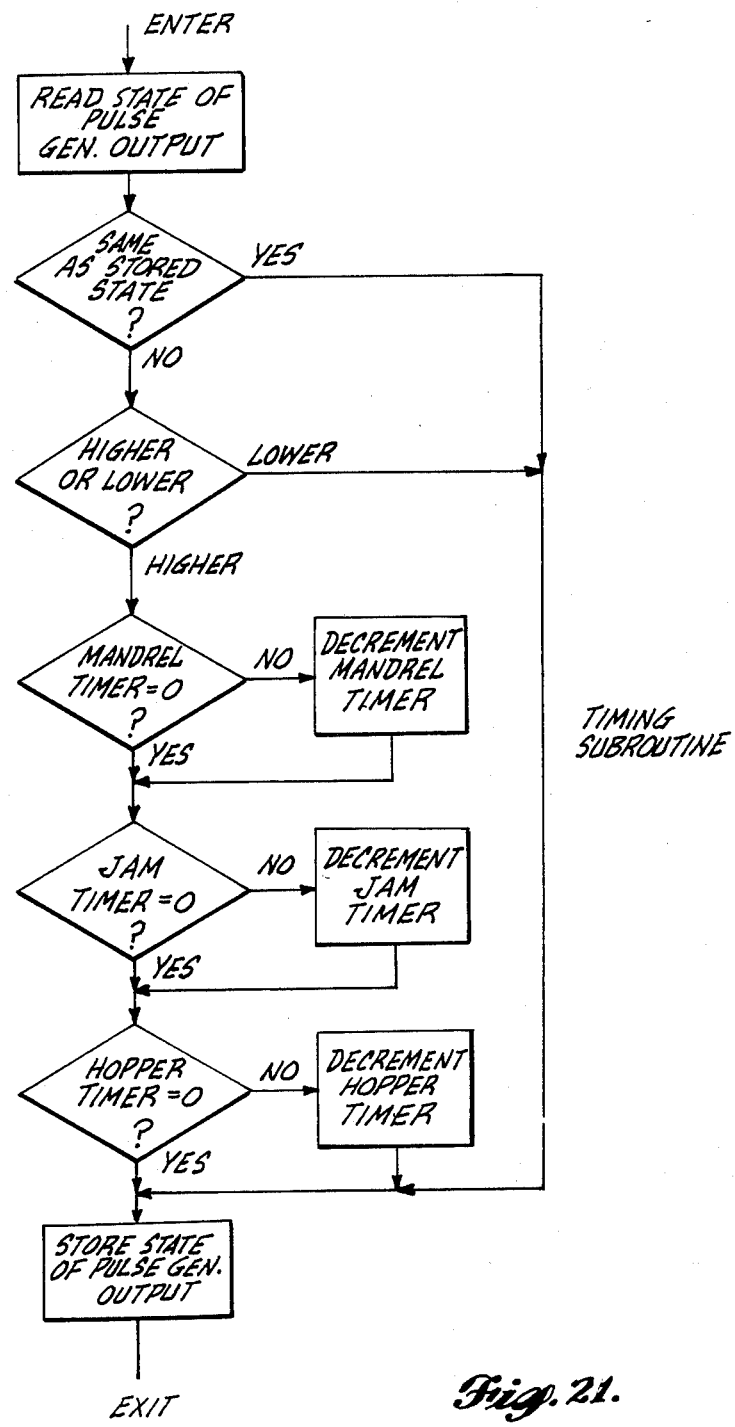
FIG. 21 is a flow diagram of a timing subroutine suitable for use in the run subroutine illustrated in FIG. 15; and, FIG. 22 is a flow diagram of an error subroutine suitable for use in the run subroutine illustrated in FIG. 15.

As noted above, when a tray blank is dropped on to the conveyor, the jam timer is set. Thereafter, the jam timer is decremented during passes through the timing subroutine (FIG. 21). If the jam timer times out before the JAM RUNNING bit of the JAM control byte is subsequently cleared, the error subroutine is entered and a jam error display is produced in the manner described below.

The read-modify switch test is included to allow the operator to temporarily halt the forming of trays by shifting the read-modify switch to the read state, which action prevents tray blanks from being dropped onto the conveyor. This mode of operation is useful when the tray forming machine is being used to feed an "assembly line" designed to fill empty trays as they are formed.

Figure 18:
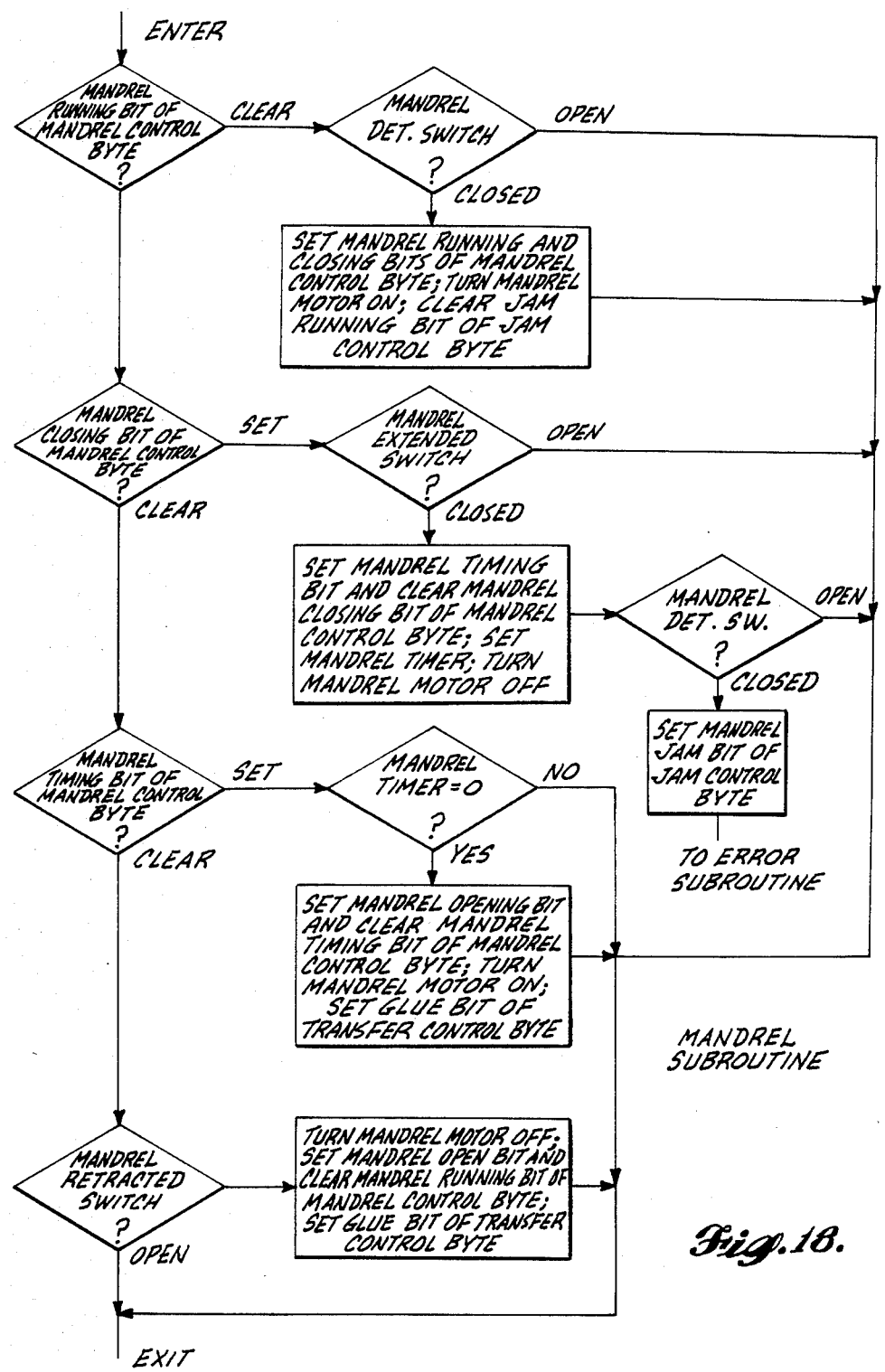
FIG. 18 is a flow diagram of a mandrel subroutine suitable for use in the run subroutine illustrated in FIG. 15.
Figure 19:
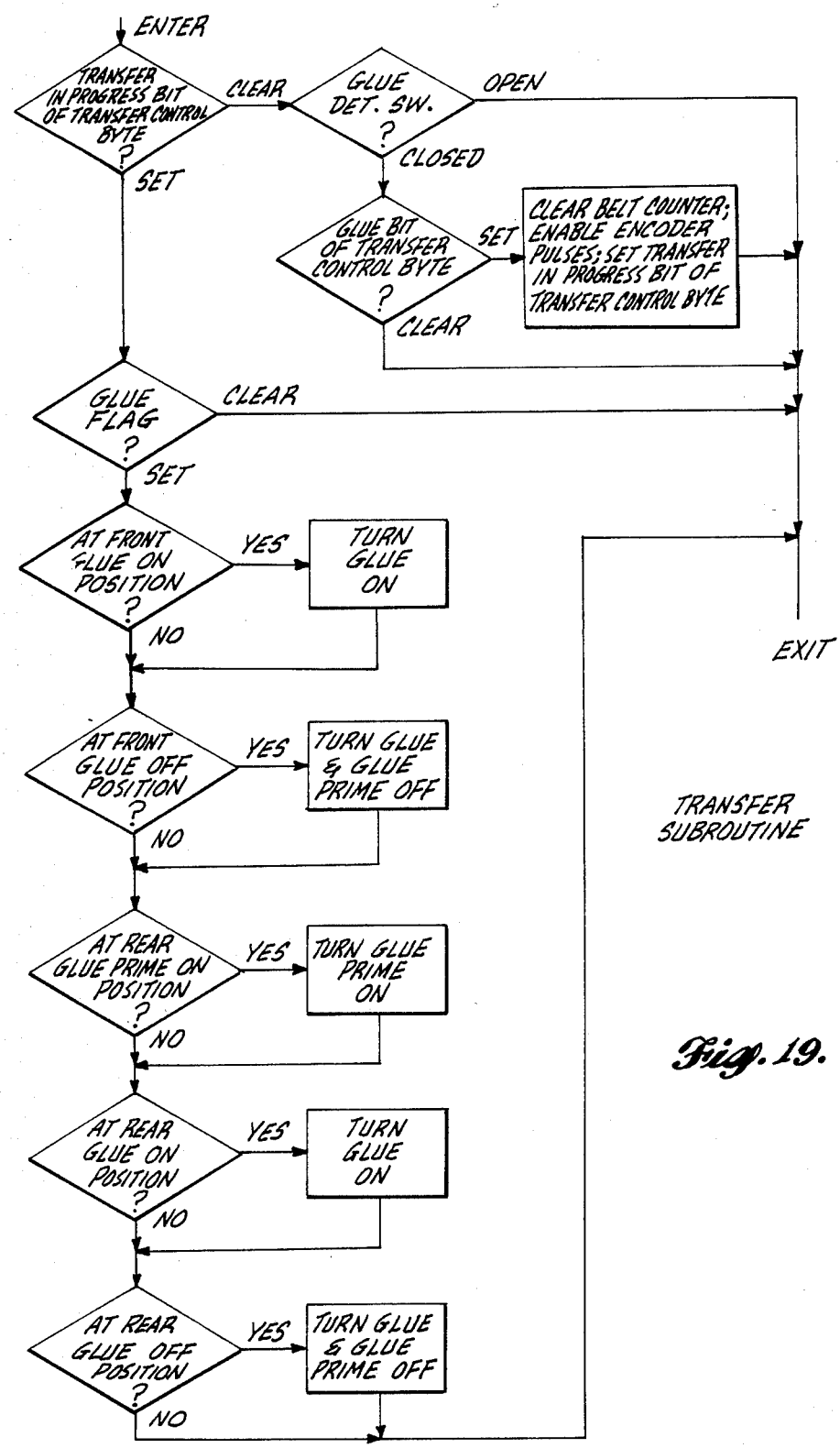
FIG. 19 is a flow diagram of a transfer subroutine suitable for use in the run subroutine illustrated in FIG. 15.
Figure 20:
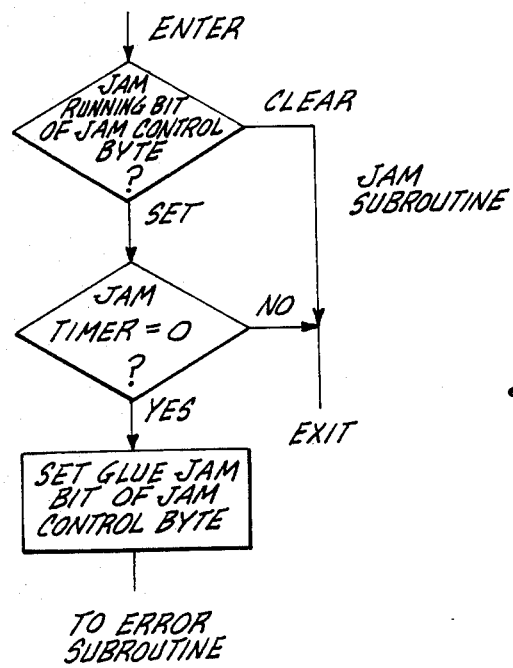
FIG. 20 is a flow diagram of a jam subroutine suitable for use in the run subroutine illustrated in FIG. 15.

The first step in the mandrel subroutine illustrated in FIG. 18 is a test of the MANDREL RUNNING bit of the MANDREL control byte. If the MANDREL RUNNING bit is clear, the mandrel detect switch is tested to determine if it is open or closed. If open, no tray is positioned between the mandrel 91 and the forming die 93. In this instance, the remaining steps to the mandrel subroutine are bypassed and the run subroutine cycles to the transfer subroutine illustrated in FIG. 19 and described below. If the mandrel detect switch is closed, indicating that a tray blank is actuating the mandrel detect switch (by intersecting the light beam in the preferred situation where the mandrel detect switch is a photoelectric switch), the MANDREL RUNNING and CLOSING bits of the MANDREL control byte are set. At the same time, the mandrel motor is turned on. Then, the JAM RUNNING bit of the JAM control byte is cleared. The JAM RUNNING bit of the JAM control byte can be cleared because the closure of the mandrel detect switch indicates that the tray blank has moved from the hopper station, through the glue station to the mandrel station prior to the jam timer timing out. After the JAM RUNNING bit has been cleared, the run subroutine cycles to the transfer subroutine illustrated in FIG. 19 and described below.

If the test of the MANDREL RUNNING bit of the MANDREL control byte determines that the MANDREL RUNNING bit was set, a test of the MANDREL CLOSING bit of the MANDREL control byte is made. If the MANDREL CLOSING bit is set, the mandrel extended switch is tested to determine if it is open or closed. If the mandrel extended switch is open, indicating that the mandrel is closing but has not reached its extended position inside of the forming die, the run subroutine cycles to the transfer subroutine illustrated in FIG. 19. If the mandrel extended switch is closed, the MANDREL TIMING bit of the MANDREL control byte is set and the MANDREL CLOSING bit of the MANDREL control byte is cleared. At the same time, the mandrel timer is set and the mandrel motor is turned off. The MANDREL CLOSING bit is cleared because the mandrel is no longer considered to be closing because it has reached the desired extended position inside of the forming die. The setting of the MANDREL TIMING bit denotes the fact that the mandrel timer has been set and is being decremented. After the mandrel motor has been turned off and the other just-described steps have occurred, the mandrel detect switch is again tested. If the mandrel detect switch is closed, the MANDREL JAM bit of the JAM control byte is set and the run subroutine cycles to the error subroutine illustrated in FIG. 22 and described below. In this instance, even though the mandrel has been actuated to press a tray blank into the forming die, an apparent jam has occurred because normal mandrel action lifts the lower edge of the tray blank being formed above the mandrel detect switch causing it to open. If such lifting does not occur, the mandrel is jammed. The jamming is sensed by the closed mandrel detect switch, which closure is detected in the manner just described and causes the run subroutine to cycle to the error subroutine to cause a mandrel jam display in the manner hereinafter described. If the mandrel detect switch is open, meaning that the lower edge of the tray blank has been raised above the mandrel detect switch, the run subroutine cycles to the hereinafter described transfer subroutine illustrated in FIG. 19.

If the MANDREL CLOSING bit of the MANDREL control byte is clear when tested, the MANDREL TIMING bit of the MANDREL control byte is tested. If the MANDREL TIMING bit is set, the mandrel timer is tested to determine if it is equal to zero (0). If the mandrel timer is not equal to zero (0), the run subroutine cycles to the transfer subroutine illustrated in FIG. 19. When the mandrel timer value is found to equal zero, the MANDREL TIMING bit is cleared, indicating that the mandrel timer has now timed out. Further, the mandrel motor is turned on resulting in the mandrel returning to its home or quiescent position. The period of time during which the mandrel was timed out is the mandrel dwell time programmed by the operator. As previously described, this time period is chosen to allow the mandrel to reside in the forming die and press the glued major and minor side flaps together against the side of the die for a period of time adequate for the adhesive being used to set up and affix the flaps together. In any event, after the mandrel motor has been turned off, the GLUE bit of the TRANSFER control byte is set. Then, the run subroutine cycles to the transfer subroutine illustrated in FIG. 19.

If the MANDREL TIMING bit of the MANDREL control byte is clear when tested, the mandrel retracted switch is tested to determine if it is open or closed. If open, the mandrel subroutine ends and the run subroutine cycles to the transfer subroutine illustrated in FIG. 19. If the mandrel retracted switch is closed, meaning that the mandrel has reached a fully retracted position, the mandrel motor is turned off. Further, the MANDREL OPEN bit is set and the MANDREL RUNNING bit is cleared. Finally, the GLUE bit of the TRANSFER control byte is set. Thereafter, the run subroutine cycles to the transfer subroutine illustrated in FIG. 19 and next described.

The first step in the transfer subroutine is a test of the TRANSFER IN PROGRESS bit of the TRANSFER control byte. If the TRANSFER IN PROGRESS bit is clear, the glue detect switch 149 is tested. As noted above, the glue detect switch 149 is located slightly upstream of the glue head 81. Preferably, it is in the form of a photoelectric switch. If the glue detect switch is open, indicating that a tray blank is not in the glue station, the run subroutine cycles to the jam subroutine illustrated in FIG. 20 and described below. If the glue detect switch is closed, the GLUE bit of the TRANSFER control byte is tested. If the GLUE bit is clear, which is the case when the mandrel is in operation, the run subroutine again cycles to the jam subroutine. If the GLUE bit of the TRANSFER control byte is set, a belt counter is cleared (i.e., zeroed). Further, encoder pulses produced by the position encoder 157 are enabled to be counted by the belt counter; and, the TRANSFER IN PROGRESS bit of the TRANSFER control byte is set. Thereafter, the run subroutine cycles to the jam subroutine.

When the test of the TRANSFER IN PROGRESS bit of the TRANSFER control byte determines that the TRANSFER IN PROGRESS bit is set, the glue function flag is tested. If the glue function flag is clear, meaning that glue is not to be applied to tray blanks passing through the glue station, the run subroutine cycles to the jam subroutine illustrated in FIG. 20 and described below. If the glue flag is set, a test is made of the belt counter to determine if the tray blank is at the front glue-on position. This test is made by comparing the belt counter value with the previously calculated front glue-on value. If the tray blank is at the front glue-on position, the glue is turned on. (At this point, it should be recalled that the glue prime was turned on during a pass through the previously described hopper subroutine.) After the glue has been turned on or if the tray blank is not at the front glue-on position, a test is made to determine if the tray blank is at the front glue-off position. If the tray blank is at the front glue-off position, the glue and glue prime are turned off. Contrariwise, if the tray is not at the front glue-off position or after the glue has been turned off, a test is made to determine if the tray blank is at the rear glue prime-on position. This test, and the front glue-off position test are made by comparing the values previously calculated for these positions with the belt counter value at the time the tests are made. If the tray blank is found to be at the rear glue prime-on position, the glue prime is turned on. After the glue prime has been turned on, or if the tray blank is not at the rear glue prime-on position, a test is made of the belt counter to determine if the tray blank is at the rear glue-on position. If the tray blank is at the rear glue-on position, the glue is turned on. After the glue has been turned on, or if the tray is not at the rear glue-on position, a test of the belt counter is made to determine if the tray blank is at the rear glue-off position. If the tray blank is at the rear glue-off position, the glue and glue prime are turned off. After the glue has been turned off, or if the tray blank is not at the rear glue-off position, the transfer subroutine ends and the run subroutine cycles to the jam subroutine illustrated in FIG. 20 and next described.

The first step in the jam subroutine is a test of the JAM RUNNING bit of the JAM control byte. If the JAM RUNNING bit is clear, the run subroutine cycles to the timing subroutine illustrated in FIG. 21 and described below. If the JAM RUNNING bit of the JAM control byte is set, indicating that the jam timer is running, the jam timer is tested to determine if it has timed out. If the jam timer has not timed out, the run subroutine cycles to the timing subroutine illustrated in FIG. 21 and described below. If the jam timer has timed out, the GLUE JAM bit of the JAM control byte is set and the run subroutine cycles to the error subroutine illustrated in FIG. 22 and described below. As a result, if the JAM RUNNING bit is reset, as trays are formed from tray blanks, before the jam timer times out, passes through the jam subroutine have no observable effect. Contrariwise, if the jam timer times out before the JAM RUNNING bit of the JAM control byte is cleared, which occurs when a tray blank becomes jammed along the conveyor path of travel, the jam subroutine causes the run subroutine to shift to the error subroutine. As described below, such a shift results in a GLUE JAM display.

The first step in the timing subroutine illustrated in FIG. 21 is to read the state of the output of a free-running pulse generator. If the state of the pulse (e.g., high or low) is the same as a stored state, determined during the immediately preceeding pass through the timing subroutine, the timing subroutine cycles to a store state of pulse generator output step, during which the state of the just read output of the pulse generator (high or low) is stored. Thereafter, as illustrated in FIG. 15, the run subroutine cycles to the ratchet subroutine illustrated in FIG. 16 and described above.

If the test of the output of the pulse generator indicates that the output has shifted from high to low or low to high, a test is made to determine if the new state is higher or lower than the previous state. If lower, meaning that the change is a trailing edge change, the timing subroutine cycles to the store state of pulse output step previously described and, then, the run subroutine cycles to the ratchet subroutine.

If the change in the output of the pulse generator is a leading edge change determined by the fact that the read output state is higher than the stored state, the mandrel timer is tested to determine if it is equal to zero. If the mandrel timer is not equal to zero, the mandrel timer is determined. After the mandrel timer has been decremented, or, if the mandrel timer was equal to zero, the jam timer is tested. If the jam timer is not equal to zero, the jam timer is decremented. After the jam timer has been decremented or if the jam timer output was equal to zero, the hopper timer is tested. If the hopper timer is not equal to zero, the hopper timer is decremented. After the hopper timer has been decremented, or if the hopper timer was equal to zero, the store state of pulse generator output step is performed and, then, the run subroutine cycles to the ratchet subroutine illustrated in FIG. 16 and described above.

As will be appreciated from the previous description of the timing subroutine, the leading edge of each pulse produced by the pulse generator causes any or all of the mandrel, jam and hopper timers to be decremented, depending upon whether or not their outputs are equal to zero. If equal to zero, the timer remains at a zero state. If not equal to zero, each tested timer is decremented.

The first step in the error subroutine illustrated in FIG. 22 is a test of the HOPPER EMPTY bit of the JAM control byte to see if it is set. If the HOPPER EMPTY bit is set, "NO" and "BOX" display words are alternately created. Thereafter, all controlled functions are inhibited. If the HOPPER EMPTY bit is clear, the GLUE JAM bit of the JAM control byte is tested. If the GLUE JAM bit is set, "GLUE" and "JAM" display words are alternately created. Thereafter, all controlled functions are inhibited. If the GLUE JAM bit of the JAM control byte is clear, the MANDREL JAM bit of the JAM control byte is tested. If the MANDREL JAM bit of the JAM control byte is set, the words "MAND" and "JAM" are alternately displayed. Thereafter, all controlled functions are inhibited. Finally, if the MANDREL JAM bit of the JAM control byte is clear, a "HELP" display is created. The "HELP" display denotes an unknown source of error. Thereafter, all controlled functions are inhibited. After the source of error has been corrected, the programmable tray forming machine is reset by an override reset button causing it to cycle back to the test of the run program switch and continue its operation from that point.

As will be appreciated from the foregoing description, the invention provides a programmable tray forming machine. Tray blanks are automatically moved from a hopper station through a glue station to a forming station whereat they are formed in a manner that results in the sealing of the side major and minor flaps of the trays, if the machine is programmed to apply glue. As a tray blank proceeds from the hopper station to the forming station, a glue head is primed and actuated to apply glue to a side major flap located adjacent the leading edge of the moving tray blank and, thereafter, apply glue to a side major flap located adjacent the trailing edge of the tray blank. While, in most instances, the glue pattern will be continuous, it can be stitched or intermittent if desired. In this regard, while not described above, stitching is provided during the glue-on commands of the transfer step by testing, for example, the output of a predetermined stage of the belt counter to determine if it is high or low. If high, glue is emitted; if low, glue emission is inhibited, or vice versa, if desired. After passing through the glue station, each tray blank is automatically moved to forming station whereat it is formed into a tray by a mandrel/forming die mechanism that is automatically actuated as a tray blank reaches a predetermined position between the mandrel and the forming die. Controllable dwell time is provided to allow adhesive adherence to occur when the mandrel lies in the die.

While a preferred embodiment of the invention has been illustrated and described, it will be appreciated that various changes can be made therein without departing from the spirit and scope of the invention. For example, switches other than those specifically described can be used to sense the position of the tray blanks if desired. Further, other types of forming dies can be utilized, if desired. Moreover, the sequence of the various subroutines of the run subroutine can be varied, if desired. Other changes that will be readily apparent to those familiar with microprocessor control systems can also be made. As a result, the invention can be practiced otherwise than as specifically described herein.

The embodiments of the invention in which an exclusive property privilege is claimed are defined as follows:

1. A programmable tray forming machine comprising:
    (A) conveyor means for receiving tray blanks at a hopper station and moving said tray blanks from said hopper station through a glue station to a mandrel station;
    (B) a hopper located at said hopper station for supplying tray blanks to said conveyor means;
    (C) controllable tray blank loading means located at said hopper station for moving tray blanks one at a time from said hopper to said conveyor means;
    (D) controllable glue means located at said glue station for selectively applying glue to tray blanks moved through said glue station by said conveyor means;
    (E) a forming die located at said mandrel station;
    (F) controllable mandrel means located at said mandrel station and aligned with said forming die for pressing tray blanks moved to said mandrel station by said conveyor means into said forming die to form said tray blanks into trays;
    (G) a control/display unit for receiving programming information and instructions entered by an operator and displaying operator usable alphanumeric information;
    (H) a plurality of sensing devices located at said hopper, glue and mandrel stations for sensing the movement of said tray blanks by said conveyor means and for sensing the operation of said controllable tray blank loading means and said controllable mandrel means;
    (I) a plurality of controlled devices coupled to said controllable tray blank loading means, said controllable glue means and said controllable mandrel means; and,
    (J) a central processing unit coupled to said control/display unit, said plurality of sensing devices and said plurality of controlled devices for:
        (1) receiving and storing said programming information and instructions entered by an operator;
        (2) receiving from said plurality of sensing devices information regarding the movement of tray blanks by said conveyor means, the operation of said controllable tray blank loading means and the operation of said controllable mandrel means; and,
        (3) controlling said controllable tray blank loading means, said controllable glue means and said controllable mandrel means via said plurality of control devices such that:
            (a) tray blanks are moved from said hopper to said conveyor means one-a-time by said controllable tray blank loading means;
            (b) said glue means selectively applies glue to said tray blanks as said tray blanks are moved through said glue station by said conveyor means; and,
            (c) trays are formed by said mandrel means and said forming dies from said tray blanks are moved to said forming station by said conveyor means.

2. A programmable tray forming machine as claimed in claim 1 wherein said programming information and instructions entered by an operator via said control/display unit includes a glue on/off instruction and wherein said central processing unit controls the emission of glue by said glue applying means as a tray is moved by said conveyor means through said glue station in accordance with said glue on/off instructions.

3. A programmable tray forming machine as claimed in claim 2 wherein said programming information and instructions entered by an operator also includes tray length information and a glue pattern length instruction and wherein said central processing unit determines and controls the location and length of the glue pattern emitted by said glue applying means when a tray blank is moved by said conveyor means through said glue station based on said tray length information and glue pattern length instruction.

4. A programmable tray forming machine as claimed in claim 3 wherein said programming information and instructions entered by an operator also includes a mandrel dwell time instruction and wherein said central processing unit controls said controllable mandrel such that said controllable mandrel stops and lies in said forming die for a predetermined time period based on said mandrel dwell time instruction.

5. A programmable tray forming machine as claimed in claim 4 wherein said programming information and instructions entered by an operator also includes a margin distance instruction and wherein said central processing unit controls the start of glue emission by said controllable glue means in accordance with said margin distance instruction.

6. A programmable tray forming machine as claimed in claim 5 wherein said central processing unit includes a programming subroutine and a run subroutine and wherein said programming information and instructions are entered by an operator when said central processing unit is in said programming subroutine.

7. A programmable tray forming machine as claimed in claim 6 wherein said run subroutine includes an initialization sequence during which a tray blank located at said mandrel station is formed into a tray.

8. A programmable tray forming machine as claimed in claim 5 wherein said run subroutine includes a loop and, while in said run subroutine loop, said central processing unit controls said controllable tray blank loading means, said controllable glue means and said controllable mandrel means such that tray blanks are continuously: (i) moved by said controllable tray blank loading means to said conveyor means; (ii) moved by said conveyor means from said hopper station through said glue station to said mandrel station; and, (iii) formed into trays at said mandrel station by said controllable mandrel means and said forming die.

9. A programmable tray forming machine as claimed in claim 8 including a position encoder connected to said conveyor means for producing pulses as said conveyor means moves and wherein said central processing unit includes a counter that counts said chain pulses and uses the resultant pulse count information to to control the application of glue by said controllable glue means as tray blanks are moved through said glue station.

10. A programmable tray forming machine as claimed in claim 9 wherein said run subroutine includes a timing subroutine and an error subroutine, said timing subroutine including timers that are set during said run subroutine and decremented, said error subroutine being entered if any of said timers times out before an associated timed action occurs, said associated timed action including the operation of said mandrel and the movement of a tray blank from said hopper station to said forming station.

11. A programmable tray forming machine as claimed in claim 1 wherein said programming information and instructions entered by an operator includes tray length information and a glue pattern length instruction and wherein said central processing unit determines and controls the location and length of the glue pattern emitted by said glue applying means when a tray blank is moved by said conveyor means through said glue station based on said tray length information and glue pattern length instruction.

12. A programmable tray forming machine as claimed in claim 1 wherein said programming information and instructions entered by an operator includes a mandrel dwell time instruction and wherein said central processing unit controls said controllable mandrel such that said controllable mandrel stops and lies in said forming die for a period of time based on said mandrel dwell time instruction.

13. A programmable tray forming machine as claimed in claim 1 wherein said central processing unit includes a programming subroutine and a run subroutine and wherein said programming information and instructions are entered by an operator when said central processing unit is operated in accordance with said programming subroutine.

14. A programmable tray forming machine as claimed in claim 13 wherein said run subroutine includes a loop and, while in said run subroutine loop, said central processing unit controls said controllable tray blank loading means, said controllable glue means and said controllable mandrel means such that tray blanks are continuously: (i) moved by said controllable tray blank loading means to said conveyor means; (ii) moved by said conveyor means from said hopper station through said glue station to said mandrel station; and, (iii) formed into trays at said mandrel station by said controllable mandrel means and said forming die.

15. A programmable tray forming machine as claimed in claim 14 wherein said run subroutine includes a timing subroutine and an error subroutine, said timing subroutine including timers that are set during said run subroutine and decremented, said error subroutine being entered if any of said timers times out before an associated timed action occurs, said associated timed action including the operation of said mandrel and the movement of a tray blank from said hopper station to said forming station.

16. A programmable tray forming machine as claimed in claim 1 including a position encoder connected to said conveyor means for producing pulses as said conveyor means moves and wherein said central processing unit includes a counter that counts said chain pulses and uses the resultant pulse count information to control the application of glue by said controllable glue means as tray blanks are moved through said glue station.

* * * * *